US008335741B2

(12) United States Patent
Kornegay et al.

(10) Patent No.: US 8,335,741 B2
(45) Date of Patent: *Dec. 18, 2012

(54) SYSTEM AND METHOD FOR INTERACTIVELY SIMULATING A CREDIT-WORTHINESS SCORE

(75) Inventors: Adam T. Kornegay, Irvine, CA (US); Joseph L. Greenwald, Orange, CA (US); Constance A. Elliott, Orange, CA (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/225,225

(22) Filed: Sep. 2, 2011

(65) Prior Publication Data
US 2012/0066116 A1  Mar. 15, 2012

Related U.S. Application Data

(63) Continuation of application No. 12/606,060, filed on Oct. 26, 2009, now Pat. No. 8,015,107, which is a continuation of application No. 10/452,155, filed on May 30, 2003, now Pat. No. 7,610,229.

(60) Provisional application No. 60/384,650, filed on May 30, 2002.

(51) Int. Cl.
*G06Q 40/00* (2006.01)
(52) U.S. Cl. .............. 705/38; 705/35; 705/36; 705/37; 705/39; 705/40
(58) Field of Classification Search .................. 705/35, 705/36, 37, 38, 39, 40
See application file for complete search history.

(56) References Cited

U.S. PATENT DOCUMENTS

| 3,316,395 | A | 4/1967 | Lavin |
| 3,316,396 | A | 4/1967 | Lavin |
| 4,305,059 | A | 12/1981 | Benton |
| 4,578,530 | A | 3/1986 | Zeidler |
| 4,736,294 | A | 4/1988 | Gill |
| 4,774,664 | A | 9/1988 | Campbell et al. |

(Continued)

FOREIGN PATENT DOCUMENTS

CA     2611595     12/2006

(Continued)

OTHER PUBLICATIONS

"Equifax and FICO Serve Consumers", Mar. 2001.

(Continued)

*Primary Examiner* — Nga B. Nguyen
(74) *Attorney, Agent, or Firm* — Knobbe, Martens, Olson & Bear LLP

(57) ABSTRACT

A system and method is provided to allow a consumer to interactively explore his credit score by submitting hypothetical values based on his actual credit data. The system uses the consumer's real credit data and the submitted hypothetical values to calculate a simulated credit score based on a simulator scorecard. The consumer may then observe the changes in the resultant scores. The system and the scorecard may utilize fewer data elements than a complete credit-worthiness scorecard and may instead focus on the key elements affecting a consumer's credit score. The system may be implemented in part on a web server or as a stand-alone application. The system may also update the score dynamically as the consumer adjusts the hypothetical values or may require the consumer to affirmatively submit the new hypothetical data.

20 Claims, 9 Drawing Sheets

U.S. PATENT DOCUMENTS

| | | |
|---|---|---|
| 4,876,592 A | 10/1989 | Von Kohorn |
| 4,895,518 A | 1/1990 | Arnold |
| 4,947,028 A | 8/1990 | Gorog |
| 5,025,373 A | 6/1991 | Keyser, Jr. et al. |
| 5,034,807 A | 7/1991 | Von Kohorn |
| 5,060,153 A | 10/1991 | Nakagawa |
| 5,148,365 A | 9/1992 | Dembo |
| 5,220,501 A | 6/1993 | Lawlor et al. |
| 5,259,766 A | 11/1993 | Sack |
| 5,262,941 A | 11/1993 | Saladin |
| 5,274,547 A | 12/1993 | Zoffel et al. |
| 5,297,031 A | 3/1994 | Gutterman et al. |
| 5,336,870 A | 8/1994 | Hughes et al. |
| 5,590,038 A | 12/1996 | Pitroda |
| 5,611,052 A | 3/1997 | Dykstra et al. |
| 5,615,408 A | 3/1997 | Johnson |
| 5,630,127 A | 5/1997 | Moore et al. |
| 5,640,577 A | 6/1997 | Scharmer |
| 5,689,651 A | 11/1997 | Lozman |
| 5,696,907 A | 12/1997 | Tom |
| 5,704,029 A | 12/1997 | Wright, Jr. |
| 5,732,400 A | 3/1998 | Mandler |
| 5,774,883 A | 6/1998 | Andersen |
| 5,793,972 A | 8/1998 | Shane |
| 5,844,218 A | 12/1998 | Kawan et al. |
| 5,875,236 A | 2/1999 | Jankowitz |
| 5,878,403 A | 3/1999 | DeFrancesco |
| 5,918,217 A | 6/1999 | Maggioncalda et al. |
| 5,924,082 A | 7/1999 | Silverman et al. |
| 5,930,764 A | 7/1999 | Melchione et al. |
| 5,930,776 A | 7/1999 | Dykstra et al. |
| 5,940,812 A | 8/1999 | Tengel et al. |
| 5,950,172 A | 9/1999 | Klingman |
| 5,956,693 A | 9/1999 | Geerlings |
| 5,966,695 A | 10/1999 | Melchione |
| 5,990,038 A | 11/1999 | Suga et al. |
| 5,995,947 A | 11/1999 | Fraser |
| 6,012,044 A | 1/2000 | Maggioncalda et al. |
| 6,021,397 A | 2/2000 | Jones et al. |
| 6,029,149 A | 2/2000 | Dykstra et al. |
| 6,038,551 A | 3/2000 | Barlow et al. |
| 6,064,987 A | 5/2000 | Walker |
| 6,070,141 A | 5/2000 | Houvener |
| 6,088,686 A | 7/2000 | Walker et al. |
| 6,094,643 A | 7/2000 | Anderson et al. |
| 6,105,007 A | 8/2000 | Norris |
| 6,115,690 A | 9/2000 | Wong |
| 6,119,103 A | 9/2000 | Basch et al. |
| 6,128,599 A | 10/2000 | Walker |
| 6,128,603 A | 10/2000 | Dent |
| 6,202,053 B1 | 3/2001 | Christiansen et al. |
| 6,249,770 B1 | 6/2001 | Erwin et al. |
| 6,311,169 B2 | 10/2001 | Duhon |
| 6,324,524 B1 | 11/2001 | Lent et al. |
| 6,330,575 B1 | 12/2001 | Moore |
| 6,385,594 B1 | 5/2002 | Lebda et al. |
| 6,405,173 B1 | 6/2002 | Honarvar |
| 6,405,181 B2 | 6/2002 | Lent et al. |
| 6,408,282 B1 | 6/2002 | Buist |
| 6,567,791 B2 | 5/2003 | Lent et al. |
| 6,611,816 B2 | 8/2003 | Lebda et al. |
| 6,622,131 B1 | 9/2003 | Brown et al. |
| 6,658,393 B1 | 12/2003 | Basch et al. |
| 6,766,304 B2 | 7/2004 | Kemp et al. |
| 6,772,132 B1 | 8/2004 | Kemp et al. |
| 6,804,346 B1 | 10/2004 | Mewhinney |
| 6,901,406 B2 | 5/2005 | Nabe et al. |
| 6,910,624 B1 | 6/2005 | Natsuno |
| 6,938,011 B1 | 8/2005 | Kemp et al. |
| 6,950,807 B2 | 9/2005 | Brock |
| 6,962,336 B2 | 11/2005 | Glass |
| 6,985,887 B1 | 1/2006 | Sunstein et al. |
| 6,988,085 B2 | 1/2006 | Hedy |
| 6,993,504 B1 | 1/2006 | Friesen et al. |
| 7,016,870 B1 | 3/2006 | Jones et al. |
| 7,028,052 B2 | 4/2006 | Chapman et al. |
| 7,062,458 B2 | 6/2006 | Maggioncalda et al. |
| 7,076,462 B1 | 7/2006 | Nelson et al. |
| 7,076,475 B2 | 7/2006 | Honarvar |
| 7,127,424 B2 | 10/2006 | Kemp et al. |
| 7,143,063 B2 | 11/2006 | Lent |
| 7,212,999 B2 | 5/2007 | Friesen et al. |
| 7,228,289 B2 | 6/2007 | Brumfield et al. |
| 7,249,076 B1 | 7/2007 | Pendleton et al. |
| 7,280,980 B1 | 10/2007 | Hoadley et al. |
| 7,337,133 B1 | 2/2008 | Bezos et al. |
| 7,337,468 B2 | 2/2008 | Metzger |
| 7,366,694 B2 | 4/2008 | Lazerson |
| 7,389,268 B1 | 6/2008 | Kemp et al. |
| 7,395,232 B1 | 7/2008 | Pilato |
| 7,403,919 B2 | 7/2008 | Chacko et al. |
| 7,409,369 B1 | 8/2008 | Homuth et al. |
| 7,418,417 B2 | 8/2008 | Chacko et al. |
| 7,505,939 B2 | 3/2009 | Lent et al. |
| 7,529,698 B2 | 5/2009 | Joao |
| 7,552,086 B1 | 6/2009 | Rajasekar et al. |
| 7,593,891 B2 | 9/2009 | Kornegay et al. |
| 7,610,229 B1 | 10/2009 | Kornegay et al. |
| 7,630,932 B2 | 12/2009 | Danaher et al. |
| 7,653,593 B2 | 1/2010 | Zarikian et al. |
| 7,711,635 B2 | 5/2010 | Steele et al. |
| 7,711,636 B2 | 5/2010 | Robida et al. |
| 7,729,983 B1 | 6/2010 | Ellis |
| 7,734,522 B2 | 6/2010 | Johnson et al. |
| 7,769,657 B2 | 8/2010 | Chacko et al. |
| 7,774,257 B2 | 8/2010 | Maggioncalda et al. |
| 7,788,147 B2 | 8/2010 | Haggerty et al. |
| 7,788,152 B2 | 8/2010 | Haggerty et al. |
| 7,788,155 B2 | 8/2010 | Jones et al. |
| 7,792,715 B1 | 9/2010 | Kasower |
| 7,792,732 B2 | 9/2010 | Haggerty et al. |
| 7,814,005 B2 | 10/2010 | Imrey et al. |
| 7,818,228 B1 | 10/2010 | Coulter |
| 7,860,782 B2 | 12/2010 | Cash et al. |
| 7,877,304 B1 | 1/2011 | Coulter |
| 7,904,306 B2 | 3/2011 | Johnson et al. |
| 7,912,770 B2 | 3/2011 | Haggerty et al. |
| 7,925,582 B1 | 4/2011 | Kornegay et al. |
| 7,941,365 B1 | 5/2011 | Bradley et al. |
| 7,945,510 B1 | 5/2011 | Bradley et al. |
| 7,970,676 B2 | 6/2011 | Feinstein |
| 7,983,975 B2 | 7/2011 | Jones et al. |
| 7,987,124 B1 | 7/2011 | Holden et al. |
| 8,001,041 B2 | 8/2011 | Hoadley et al. |
| 8,005,738 B2 | 8/2011 | Chacko et al. |
| 8,015,107 B2 * | 9/2011 | Kornegay et al. ............... 705/38 |
| 8,024,263 B2 | 9/2011 | Zarikian et al. |
| 8,060,424 B2 | 11/2011 | Kasower |
| 8,073,768 B2 | 12/2011 | Haggerty et al. |
| 8,078,524 B2 | 12/2011 | Crawford et al. |
| 8,086,523 B1 | 12/2011 | Palmer |
| 8,099,356 B2 | 1/2012 | Feinstein et al. |
| 8,165,940 B2 | 4/2012 | Meimes et al. |
| 8,195,549 B2 | 6/2012 | Kasower |
| 8,285,613 B1 | 10/2012 | Coulter |
| 2001/0011245 A1 | 8/2001 | Duhon |
| 2001/0039523 A1 | 11/2001 | Iwamoto |
| 2001/0049672 A1 | 12/2001 | Moore et al. |
| 2002/0032645 A1 | 3/2002 | Nozaki et al. |
| 2002/0032647 A1 | 3/2002 | Delinsky et al. |
| 2002/0035511 A1 | 3/2002 | Haji et al. |
| 2002/0069122 A1 | 6/2002 | Yun et al. |
| 2002/0073017 A1 | 6/2002 | Robertson |
| 2002/0077964 A1 | 6/2002 | Brody et al. |
| 2002/0099641 A1 | 7/2002 | Mills et al. |
| 2002/0111890 A1 | 8/2002 | Sloan et al. |
| 2002/0128962 A1 | 9/2002 | Kasower |
| 2002/0147695 A1 | 10/2002 | Khedkar et al. |
| 2002/0169747 A1 | 11/2002 | Chapman et al. |
| 2002/0198824 A1 | 12/2002 | Cook |
| 2003/0004853 A1 | 1/2003 | Ram et al. |
| 2003/0009411 A1 | 1/2003 | Ram et al. |
| 2003/0009418 A1 | 1/2003 | Green et al. |
| 2003/0018549 A1 | 1/2003 | Fei et al. |
| 2003/0028477 A1 | 2/2003 | Stevenson et al. |
| 2003/0046223 A1 | 3/2003 | Crawford et al. |
| 2003/0065563 A1 | 4/2003 | Elliott et al. |

| | | |
|---|---|---|
| 2003/0154162 A1 | 8/2003 | Danaher et al. |
| 2003/0163435 A1 | 8/2003 | Payone |
| 2003/0236738 A1 | 12/2003 | Lange et al. |
| 2004/0006536 A1 | 1/2004 | Kawashima et al. |
| 2004/0010458 A1 | 1/2004 | Friedman |
| 2004/0030621 A1 | 2/2004 | Cobb |
| 2004/0030629 A1 | 2/2004 | Freeman et al. |
| 2004/0107132 A1 | 6/2004 | Honarvar et al. |
| 2004/0111292 A1 | 6/2004 | Hutchins |
| 2004/0111358 A1 | 6/2004 | Lange et al. |
| 2004/0111359 A1 | 6/2004 | Hudock |
| 2004/0138995 A1 | 7/2004 | Hershkowitz et al. |
| 2004/0158521 A1 | 8/2004 | Newton |
| 2004/0186807 A1 | 9/2004 | Nathans et al. |
| 2004/0199456 A1 | 10/2004 | Flint et al. |
| 2005/0004855 A1 | 1/2005 | Jenson et al. |
| 2005/0154664 A1 | 7/2005 | Guy et al. |
| 2005/0283415 A1 | 12/2005 | Studnitzer et al. |
| 2006/0014129 A1 | 1/2006 | Coleman et al. |
| 2006/0059083 A1 | 3/2006 | Friesen et al. |
| 2006/0080251 A1 | 4/2006 | Fried et al. |
| 2006/0095363 A1 | 5/2006 | May |
| 2006/0100954 A1 | 5/2006 | Schoen |
| 2006/0155639 A1 | 7/2006 | Lynch et al. |
| 2006/0173772 A1 | 8/2006 | Hayes et al. |
| 2006/0178971 A1 | 8/2006 | Owen et al. |
| 2006/0178983 A1 | 8/2006 | Nice et al. |
| 2006/0200396 A1 | 9/2006 | Satterfield et al. |
| 2006/0233332 A1 | 10/2006 | Toms |
| 2006/0242039 A1 | 10/2006 | Haggerty et al. |
| 2006/0242049 A1 | 10/2006 | Haggerty et al. |
| 2006/0242051 A1 | 10/2006 | Haggerty et al. |
| 2006/0265323 A1 | 11/2006 | Winter et al. |
| 2007/0016500 A1 | 1/2007 | Chatterji et al. |
| 2007/0016501 A1 | 1/2007 | Chatterji et al. |
| 2007/0067206 A1 | 3/2007 | Haggerty et al. |
| 2007/0078741 A1 | 4/2007 | Haggerty et al. |
| 2007/0100719 A1 | 5/2007 | Chwast et al. |
| 2007/0233591 A1 | 10/2007 | Newton |
| 2007/0244732 A1 | 10/2007 | Chatterji et al. |
| 2007/0260539 A1 | 11/2007 | Delinsky |
| 2007/0282736 A1 | 12/2007 | Conlin et al. |
| 2007/0288338 A1 | 12/2007 | Hoadley |
| 2007/0299770 A1 | 12/2007 | Delinsky |
| 2007/0299771 A1 | 12/2007 | Brody |
| 2008/0133322 A1 | 6/2008 | Kalia et al. |
| 2008/0140507 A1 | 6/2008 | Hamlisch et al. |
| 2008/0270294 A1 | 10/2008 | Lent et al. |
| 2009/0063330 A1 | 3/2009 | Cerise |
| 2009/0144160 A1 | 6/2009 | Haggerty et al. |
| 2009/0144185 A1 | 6/2009 | Haggerty et al. |
| 2010/0009320 A1 | 1/2010 | Wilkelis |
| 2010/0010935 A1 | 1/2010 | Shelton |
| 2010/0082476 A1 | 4/2010 | Bowman |
| 2010/0145840 A1 | 6/2010 | Kasower |
| 2010/0169209 A1 | 7/2010 | Kornegay et al. |
| 2010/0299251 A1 | 11/2010 | Thomas |
| 2010/0299252 A1 | 11/2010 | Thomas |
| 2010/0299260 A1 | 11/2010 | Thomas |
| 2010/0324986 A1 | 12/2010 | Thomas |
| 2010/0325036 A1 | 12/2010 | Thomas |
| 2011/0004514 A1 | 1/2011 | Thomas |
| 2011/0004546 A1 | 1/2011 | Thomas |
| 2011/0060673 A1 | 3/2011 | Delinsky |
| 2011/0166988 A1 | 7/2011 | Coulter |
| 2011/0295733 A1 | 12/2011 | Megdal et al. |
| 2012/0066106 A1 | 3/2012 | Papadimitriou |
| 2012/0066116 A1 | 3/2012 | Kornegay et al. |
| 2012/0116951 A1 | 5/2012 | Chung et al. |
| 2012/0123931 A1 | 5/2012 | Megdal et al. |
| 2012/0265661 A1 | 10/2012 | Megdal et al. |

FOREIGN PATENT DOCUMENTS

| | | |
|---|---|---|
| EP | 0 869 652 | 10/1998 |
| EP | 0 913 789 | 5/1999 |
| EP | 1 028 401 | 8/2000 |
| JP | 2003-016261 | 1/2003 |
| MX | 2007-015510 | 4/2008 |
| WO | WO 00/11574 | 3/2000 |
| WO | WO 01/39589 | 6/2001 |
| WO | WO 01/41083 | 6/2001 |
| WO | WO 01/41355 | 6/2001 |
| WO | WO 01/57720 | 8/2001 |
| WO | WO 01/84281 | 11/2001 |
| WO | WO 2004/114160 | 12/2004 |
| WO | WO 2005/022348 | 3/2005 |
| WO | WO 2006/099492 | 9/2006 |
| WO | WO 2006/135451 | 12/2006 |

OTHER PUBLICATIONS

Jan. 14, 2009—Examiner Summary of Interview in U.S. Appl. No. 10/452,155.
Jan. 20, 2006—Office Action in U.S. Appl. No. 09/790,453.
Jan. 22, 2008—Office Action Response in U.S. Appl. No. 10/183,135.
Jan. 25, 2008—Office Action in U.S. Appl. No. 10/452,155.
Jan. 3, 2008—Office Action Response in U.S. Appl. No. 09/790,453.
Oct. 2, 2008—Office Action in U.S. Appl. No. 10/452,155.
Oct. 22, 2007—Office Action in U.S. Appl. No. 10/183,135.
Nov. 8, 2007—Office Action Response in U.S. Appl. No. 09/790,453.
Dec. 1, 2006—Office Action in U.S. Appl. No. 09/790,453.
Dec. 22, 2008—Office Action Response in U.S. Appl. No. 10/183,135.
Dec. 26, 2008—Office Action in U.S. Appl. No. 11/363,984.
Feb. 26, 2009—Office Action in U.S. Appl. No. 10/183,135.
Mar. 1, 2007—Office Action Response in U.S. Appl. No. 09/790,453.
Mar. 21, 2008—Office Action in U.S. Appl. No. 09/790,453.
Apr. 14, 2008—Office Action in U.S. Appl. No. 10/183,135.
Apr. 2, 2009—Office Action Response in U.S. Appl. No. 10/452,155.
Apr. 20, 2006—Office Action Response in U.S. Appl. No. 09/790,453.
May 10, 2007—Office Action in U.S. Appl. No. 09/790,453.
Jun. 11, 2008—Office Action Response in U.S. Appl. No. 10/183,135.
Jun. 3, 2008—Office Action Response in U.S. Appl. No. 09/790,453.
Jul. 11, 2006—Office Action in U.S. Appl. No. 09/790,453.
Jul. 23, 2008—Examiner Summary of Interview in U.S. Appl. No. 10/452,155.
Jul. 25, 2008—Office Action Response in U.S. Appl. No. 10/452,155.
Aug. 21, 2008—Office Action in U.S. Appl. No. 10/183,135.
Sep. 15, 2003—Preliminary Amendment in U.S. Appl. No. 10/452,155.
Sep. 8, 2006—Office Action Response in U.S. Appl. No. 09/790,453.
Announcing TrueProfiler, Nov. 20, 2000, http://www.truecredit.com/index.asp, 2 pages.
CreditXpert Inc., CreditExpert 3-Bureau Comparison.TM., [online] [retrieved on Jun. 7, 2005] Retrieved from the internet <URL: http://www.creditxpert.com/CreditXpert%203-Bureau%20Comparison(TM)%20sample.pdf>, 2002.
CreditXpert Inc., CreditXpert Credit Score & Analysis, [online] [retrieved on Jun. 7, 2005] Retrieved from the internet <URL:http://www.creditxpert.com/CreditXpert%20Score%20&%20Analysis20and%20Credit%20Wizard%20sample.pdf>, 2002.
CreditXpert Inc., CreditXpert Essentials.TM Advisor View, [online] [retrieved on Jun. 7, 2005] Retrieved from the internet <URL: http://www.creditxpert.com/cx_ess_app.pdf>, 2004.
CreditXpert Inc., CreditXpert Essentials.TM. Applicant View, [online] [retrieved on Jun. 7, 2005] Retrieved from the internet <URL: http://www.creditxpert.com/cx_ess_app.pdf>, 2004.
CreditXpert Inc., CreditXpert What-If Simulator.TM., [online] [retrieved on Jun. 7, 2005] Retrieved from the internet <URL: http://www.creditxpert.com/CreditXpert%20What-If%20Simulator(TM)%20sample.pdf>, 2002.
Data Validation Tips and Techniques—zdnet.com Sep. 1, 1999.
Experian Announces PLUS Score; Experian Press Release dated Oct. 16, 2003; Experian Global Press Office.
Fair Isaac Corporation, myFICO: Calculators: Credit Assessment, [online] [retrieved on Jun. 8, 2005] Retrieved from the internet <URL: http://www.myfico.com/CreditEducation/Calculators/CreditAssessmentaspx>, 2005.

Fair Isaac Corporation, myFICO: Help: FICO Score Simulator, [online] [retrieved on Jun. 8, 2005] Retrieved from the internet <URL: http://www.myfico.com/Help/Simulator.aspx?fire=5>, 2005.
Fair Isaac Corporation, myFICO: Products: Suze Orman's FICO Kit Platinum: Look for Errors, [online] [retrieved on Jun. 7, 2005] Retrieved from the internet <URL: http://www.myfico.com/Products/FICOKit/Sample02.html>, 2005.
Fair Isaac Corporation, myFICO: Products: Suze Orman's FICO Kit Platinum, [online] [retrieved on Jun. 8, 2005] Retrieved from the internet <URL: http://www.myfico.com/Products/FICOKit/Description.aspx>, 2005.
Fair Isaac Corporation, myFICO: Sample: FICO Score Simulator: "Max Out" Your Credit Cards, [online] [retrieved on Jun. 8, 2005] Retrieved from the internet <URL: http://www.myfico.com/Content/Samples/Sample_ScoreSimulatorResults.asp?Simulation=4&ReportID.
Fair Isaac Corporation, myFICO: Sample: FICO Score Simulator: Miss Payments, [online] [retrieved on Jun. 8, 2005] Retrieved from the internet <URL: http://www.myfico.com/Content/Samples/Sample_ScoreSimulatorResults.asp?miss_payment=radiobutton&Simulation=.
Fair Isaac Corporation, myFICO: Sample: FICO Score Simulator: Pay Down Delinquent Balances First, [online] [retrieved on Jun. 8, 2005] Retrieved from the internet <URL: http://www.myfico.com/Content/Samples/Sample_ScoreSimulatorResults.asp?textfieldCC=750.
Fair Isaac Corporation, myFICO: Sample: FICO Score Simulator: Suggested Best Action, [online] [retrieved on Jun. 8, 2005] Retrieved from the internet <URL: http://www.myfico.com/Content/Samples/Sample_ScoreSimulatorResults.asp?Simulation=111&ReportID=1&Pr.
Fair Isaac Corporation, myFICO: Products: Suze Orman's FICO® Kit Platinum: FICO Score Check, [online] [retrieved on Jun. 7, 2005] Retrieved from the internet <URL: http://www.mvfico.com/Products/FICOKit/Sample03.html>, 2005.
Fair Isaac Corporation, myFICO: Products:Suze Orman's FICO® kit Platinum: Your FICO Score, [online] [retrieved on Jun. 7, 2005] Retrieved from the internet<URL: http://www.mvfico.com/Products/FICOKit/Sample01.html> 2005.
Fair Isaac Corporation, myFICO: Sample: FICO Score Simulator, [online] [retrieved on Jun. 8, 2005] Retrieved from the internet <URL: http://www.rnyfico.com/Content/Samples/Sample_ScoreSimulator.asp>, 2005.
Fair Isaac Corporation, myFICO: Sample: FICO Score Simulator: Pay Down the Balances on All Your Credit Cards, [online] [retrieved on Jun. 8, 2005] Retrieved from the internet <URL: http://www.myfico.com/Content/Samples/Sample_ScoreSimulatorResults.asp?textfieldCC1=750&SelectMonths=1&PayOption=radiobutton&textfieldCC=750&Simulation=3&ReportID=1&ProductID=&Execute.x=57&Execute.y=22>,2005.
Fair Isaac Corporation, myFICO: Sample: FICO Score Simulator: Pay Your Bills on Time. [online] [retrieved on Jun. 8, 2005] Retrieved from the internet <URL: http://www.myfico.com/Content/Samples/Sample_ScoreSimulatorResults.asp?select1=1&Simulation=1&ReportID=I&ProductID=&PayBillsOnTime.x=93&PavBillsOnTime.y=23>, 2005.
Fair Isaac Corporation, myFICO: Sample: FICO Score Simulator: Seek New Credit, [online] [retrieved on Jun. 8, 2005] Retrieved from the internet <URL: http://www.myfico.com/Content/Samples|Sample_ScoreSimulatorResults.asp?new_credit=radiobutton&textfield5A=3000&textfield5B=&textfield5C=&Simulation=5&ReportID=1&ProductID=&NewCredit.x=62&NewCredit.v=20>, 2005.
Fair Isaac Corporation, myFICO: Sample: FICO Score Simulator: Transfer Credit Card Balances, [online] [retrieved on Jun. 8, 2005] Retrieved from the internet <URL: http://www.myfico.com/Content/Samples/Sample_ScoreSimulatorResults.asp?textfield222=5000&Simulation=6&ReportID=1&ProductID=&TransferBalance.x=86&TransferBalance. y=24>, 2005.
FICP Guide Service, Nov. 20, 2000, https://www.ficoguide.com/sample_report.cfm, 10 pages.
How Much Does a Low FICO Score Cost? Jul. 14, 2000, http://ficobuilder.com/kbsrch.htm, 2 pages.
International Preliminary Report on Patentability for Application No. PCT/US2005/041814 mailed Aug. 26, 2007 in 9 pages.
Lee, W.A., "Experian Eyes Payments, Mulls Deals" American Banker, May 30, 2003 in 2 pages.
Lee, W.A., "Money, Quicken, and the Value of Alliances", American Banker, Jul. 17, 2003 in 2 pages.
Occasional CF Newsletter; http://www.halhems.com/index.cfm?fuseaction=newsletters.oct1999.
Office Action from U.S. Appl. No. 11/169,769 (017A2CP4 counterpart).
Overview, Aug. 7, 2000, file:///Windy%20Hillo/Desktop%20Folder/Fair%20Isacc%20explainer%20call%20Irene/CreditXpert%AA , 12 pages.
PCT Form IB/326 with International Preliminary Report and Written Opinion with International Search Report mailed Aug. 29, 2007 listing above references.
Powerforms: Declarative Client-Side For Field Validation, ISSN 1386-145x, Dec. 2000.
Singletary, M. "Score One for Open Credit Ratings." The Washington Post, Washington DC, Jun. 18, 2000, 3 pages.
Singletary, Michelle "Ratings for the Credit Raters", The Washington Post, The Color of Money column, Mar. 24, 2002 in 1 page.
Stanton, T.H. "Credit Scoring and Loan Scoring as Tools for Improved Management of Federal Credit Programs." Financier, Philadelphia, Summer 1999, vol. 6, 36 pages.
TrueProfiler add on to any credit report for only $3.95, Nov. 20, 2000, https://www.truecredit.com/credit/TrueProfileSample.asp, 10 pages.
TrueProfiler Sample, Nov. 20, 2000; https://www.truecredit.com/credit/ScoreDetailSample.asp.
Watts, Craig, "Consumers Now Can Know What Loan Rate Offers to Expect Based on Their FICO Credit Score at MyFICO.com", Mar. 6, 2002, <http://www.myfico.com/PressRoom/PressReleases/2002_03_06.aspx>.
Watts, Craig, "Fair, Isaac and Equifax Give Consumers New Score Power Tools Offering Greater Insights for Managing Their Credit Health", May 21, 2002, (http://www.myfico.com/PressRoom/PressReleases/2002_05_21.aspx).
Webpage printed from <http://www.magnum.net/pdfs/RapUpBrochure.pdf.> on Mar. 4, 2008.
www.halhems.com/index.cfm?fuseaction=newsletters.oct1999.
Your ficobuilder.com order is here! Jul. 3, 2000, 46 pages.
Yücesan et al.., "Distributed web-based simulation experiments for optimization", Simulation Practice and Theory 9 (2001), pp. 73-90.
Zimmerman et al., "A web-based platform for experimental investigation of electric power auctions", Decision Support Systems 24 (1999), pp. 193-205.
Zoot—"Instant Rules GUI" Printed Mar. 3, 2009 www.zootweb.com/instant_rules_GUI.html, in 1 page.
Zoot—"Rules Management GUI" printed Mar. 3, 2008 www.zootweb.com/rules_management_GUI.html in 1 page.
Stein, Benchmarking Default Prediction Models: Pitfalls and Remedies in Model Validation, Moody's KMV, Revised Jun. 13, 2002, Technical Report #020305; New York.
CISCO:What-If Simulator, http://www.ciscocredit.com/whatifsim.html printed Oct. 12, 2012 in 2 pages.
CISCO:Your Mortgage Credit Reporting Specialists, http://www.ciscocredit.com/cc_Services.html#what printed Oct. 12, 2012 in 4 pages.
CreditXpert, http://www.creditxpert.com/Products/individuals.asp printed Oct. 12, 2012 in 1 page.
Credit Karma: How Credit Karma Works, http://www.creditkarma.com/help/howitworks printed Oct. 12, 2012 in 2 pages.
Credit Plus, Inc.: Score Wizard, http://web.archive.org/web/200308060803/www.creditplus.com/scorewizard.asp dated Nov. 27, 2002 & Mar. 23, 2003.
Credit Source Online: The Secrets of Raising Your Credit Score, http://www.creditsourceonline.com/secrets-of-raising-your-credit-score.html printed Oct. 12, 2012 in 4 pages.
Demby, Elayne, "Special Report: Letting Consumers Know the Score—and More", Collections and Credit Risk, New York, Feb. 2003, vol. 8, Issue 2, p. 53, 3 pages.

Ecredable: Discover your AMP Credit Rating™, http://www.ecredable.com/how-it-works/amp-credit-rating printed Oct. 12, 2012 in 2 pages.

Equifax:Consumer Bureau, http://www.equifax.co.in/financial-services/consumer_bureau/en_in#RiskScore printed Oct. 12, 2012 in 3 pages.

Experian, http://www.experian.com/ printed Oct. 12, 2012 in 1 page.

Financial Engines, http://corp.financialengines.com/ printed Oct. 12, 2012 in 1 page.

"Judging Credit: Consumers Need Better Finance Tools", News Journal, Daytona Beach, FL, Dec. 28, 2002.

Lee, W.A., "Fair Isaac Taps Institutions for Credit Score Distribution", American Banker: The Financial Services Daily, New York, NY, Apr. 9, 2002, vol. 167, Issue 67, 1 page.

MyFico, http://www.myfico.com/products/ficoone/sample/sample_scoresimulator.aspx printed Oct. 12, 2012 in 3 pages.

TransUnion: VantageScore®—Consistency in Credit Scoring, http://www.transunion.com/personal-credit/credit-reports/vantage-score. page printed Oct. 12, 2012 in 2 pages.

Watts, Craig, "Consumers Now Can Know What Loan Rate Offers to Expect Based on Their FICO Credit Score at MyFICO.com", Mar. 6, 2002, http://www.myfico.com/PressRoom/PressReleases/2002_03_06.aspx.

Watts, Craig, "Fair, Isaac and Equifax Give Consumers New Score Power Tools Offering Greater Insights for Managing Their Credit Health", May 21, 2002, http://www.myfico.com/PressRoom/PressReleases/2002_05_21.aspx.

"Impac Funding Introduces Enhanced Website for Static Pool Tracking of MBS Transactions," Walthham, MA; Webpage printed out from <http://www.lewtan.com/press/1208044_Impac-Lewtan.htm> on Mar. 20, 2008.

"JPMorgan Worldwide Securities Services to Acquire Paloma's Middle and Back Office Operations," Webpage printed from <http://www.jpmorgan.com> on Apr. 1, 2009.

Announcing TrueProfiler, http://web.archive.org/web/20021201123646/http://www.truecredit.com/index.asp, dated Dec. 1, 2002, 2 pages.

CreditXpert Inc., CreditXpert Essentials™, Advisor View-Experian Jul. 7, 2003, [online] [retrieved on Nov. 29, 2004] Retrieved from the internet <URL: http://www.creditxpert.com/cx_ess_app.pdf>, 2004., Issue Wallace.

Ettore, Paul Kahn on Exceptional Marketing. Management Review, vol. 38(11), Nov. 1994, pp. 48-51.

Ideon, Credit-Card Registry that Bellyflopped this Year, Is Drawing some Bottom-Fishers, The Wall Street Journal, Aug. 21, 1995, pp. C2.

Zoot—Zoot's Hosted Environment, <http://www.zootweb.com/zootasp.html> as printed Mar. 3, 2008.

International Preliminary Report on Patentability and Written Opinion for Application No. PCT/US2005/041814, dated Aug. 29, 2007.

* cited by examiner

SYSTEM AND METHOD FOR INTERACTIVELY SIMULATING A CREDIT-WORTHINESS SCORE

CROSS-REFERENCE TO RELATED APPLICATIONS

This application is a continuation of U.S. patent application Ser. No. 12/606,060, filed Oct. 26, 2009, now U.S. Pat. No. 8,015,107; which is a continuation of U.S. patent application Ser. No. 10/452,155, filed May 30, 2003, now U.S. Pat. No. 7,610,229; which claims the benefit of priority to U.S. Prov. Pat. App. No. 60/384,650, filed May 30, 2002.

BACKGROUND OF THE INVENTION

1. Field of the Invention

The present invention relates to a system and method for teaching consumers about the interaction of credit data elements in determining a credit risk score. More particularly, the present invention relates to a system and method for simulating a consumer's credit risk score and for providing the consumer the opportunity to adjust his credit data to hypothetical values in order to observe the changes in the simulated score.

2. Description of Background Art

The practice of predicting a consumer's credit-worthiness is well known. Conventional credit-worthiness, or credit risk, analysis focuses on a consumer's credit history and other factors to determine whether credit should be offered or granted to the consumer.

Conventional credit risk analysis utilizes a risk model, or scorecard, to give a relative weight to each data element in the credit history to provide a credit-worthiness score. These models vary from provider to provider depending on the needs of the financial institution requesting the credit score. The methodology behind creating a risk model is known in the art.

Financial institutions that request a consumer's credit-worthiness score do so for several reasons. First, institutions often pre-screen potential applicants to determine to whom they should mail an offer of credit and at what terms. Typically, an institution will provide a score cut-off or tiered system for providing various terms and rates to different credit-worthiness score brackets. Pre-screening is used primarily to generate new business for the institution. Second, businesses use the credit-worthiness score in granting real-time requests by a consumer for a line of credit. This may include applying for a home mortgage, buying a car, or opening a new credit card account at the point of sale. In these instances, the credit score is requested and compared against the institution's credit risk policy to determine whether the new line of credit will be provided.

With creditors and lenders placing such a large emphasis on a consumer's credit-worthiness score, it is common for a consumer to want to improve his score. Typically, the scorecards utilize complex mathematical models and algorithms to arrive at a credit-worthiness score. The complexity of the scoring process is a stumbling block for consumers who want to understand how their scores were generated and how to improve their scores. Conventional attempts to educate consumers have failed to provide clear answers to consumers' questions. Most credit scoring vendors have deliberately withheld information on how credit scores are generated for fear of adding additional levels of confusion. Explanations and tutorials offered to consumers have been non-interactive and text-based. Furthermore, conventional solutions have not used the consumer's own credit data to illustrate the process.

Therefore there is a need for a system that (1) provides information to the consumer regarding score improvement, (2) uses the consumer's own credit data to illustrate the score generation process, and (3) allows the user to interact with the system and to experiment with different credit data in order to explore the hypothetical changes in his credit-worthiness score.

SUMMARY OF THE INVENTION

A system and method for simulating a consumer's credit-worthiness score based on both initial data and consumer-modified data is described. In one embodiment, the initial data is credit bureau data associated with a particular consumer. In another embodiment, the initial data is census bureau data based on the average consumer. In yet another embodiment, the initial data can be made more relevant to the particular consumer by refining the census bureau data based on certain factors such as location, age, and profession.

In one embodiment, the system includes a client terminal, a simulator server, a credit data server, and a scorecard data server. The client terminal and the data servers are each coupled to the simulator server. The client terminal and simulator server are configured to allow a consumer using the client terminal to communicate interactively with the simulator server to explore various aspects and factors comprising his credit-worthiness score. The simulator server calculates an initial credit-worthiness score by applying a simulator scorecard to data from the credit data server and then presents the consumer with options for modifying this data. The consumer is prompted to adjust the values of the initial data to produce modified data in order to observe the resultant change in his credit score. As the data is adjusted, the simulator server uses the simulator scorecard to recalculate the credit-worthiness score based on any unaltered initial data and the modified data.

In a preferred embodiment, the recalculation of the credit score is performed automatically by the simulator server and does not require an explicit submission of the modified data by the consumer.

In another embodiment, the simulator server utilizes a simulator scorecard that calculates the credit-worthiness score based on only a portion of the credit data commonly used to calculate credit scores. Since only a portion of the credit data is used, the resulting credit score is an approximation of what the credit score would be had all of the information been used. By using a smaller set of data elements, the system is able to respond more quickly to a consumer's submitted modified data, and the interface with the consumer is simpler. This allows the consumer to focus on the key data elements, which greatly affect his score, without having to worry about all the less important data elements, which only refine his score. The simulator server also analyzes the initial data to determine which subset of data elements most affect the consumer's score and calculates the simulated score based on the values of those elements. In one embodiment, those data elements are the only data elements presented to the consumer for the submission of modified data.

In yet another embodiment, the data values are presented in the form of graphical slider bars, first set to the initial data values. The consumer adjusts the data values by clicking and dragging the graphical slider bars to new values. In a preferred embodiment, as a graphical slider bar is dragged, the simulator score is updated. This allows the user to gain an understanding of how his credit data affects his score and helps the consumer to plan an effective path to better credit.

In the preferred embodiment, the client terminal, simulator server, scorecard data server, and credit data server are each coupled to a network in order to communicate with each other. In an alternate embodiment, the system is self-contained, with the client terminal, simulator server, scorecard data server, and credit data server all residing on one computer. The computer is a general-purpose computer or a computer specifically optimized to calculate the simulated scores.

In yet another embodiment, the client terminal is implemented as a web browser. In this embodiment, the client terminal is situated at a point across the network from the simulator server or is co-located with the simulator server. Additionally, in this embodiment the simulator server creates and serves a web page to the client terminal for interacting with the consumer.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION OF THE PREFERRED EMBODIMENTS

Figure 1:
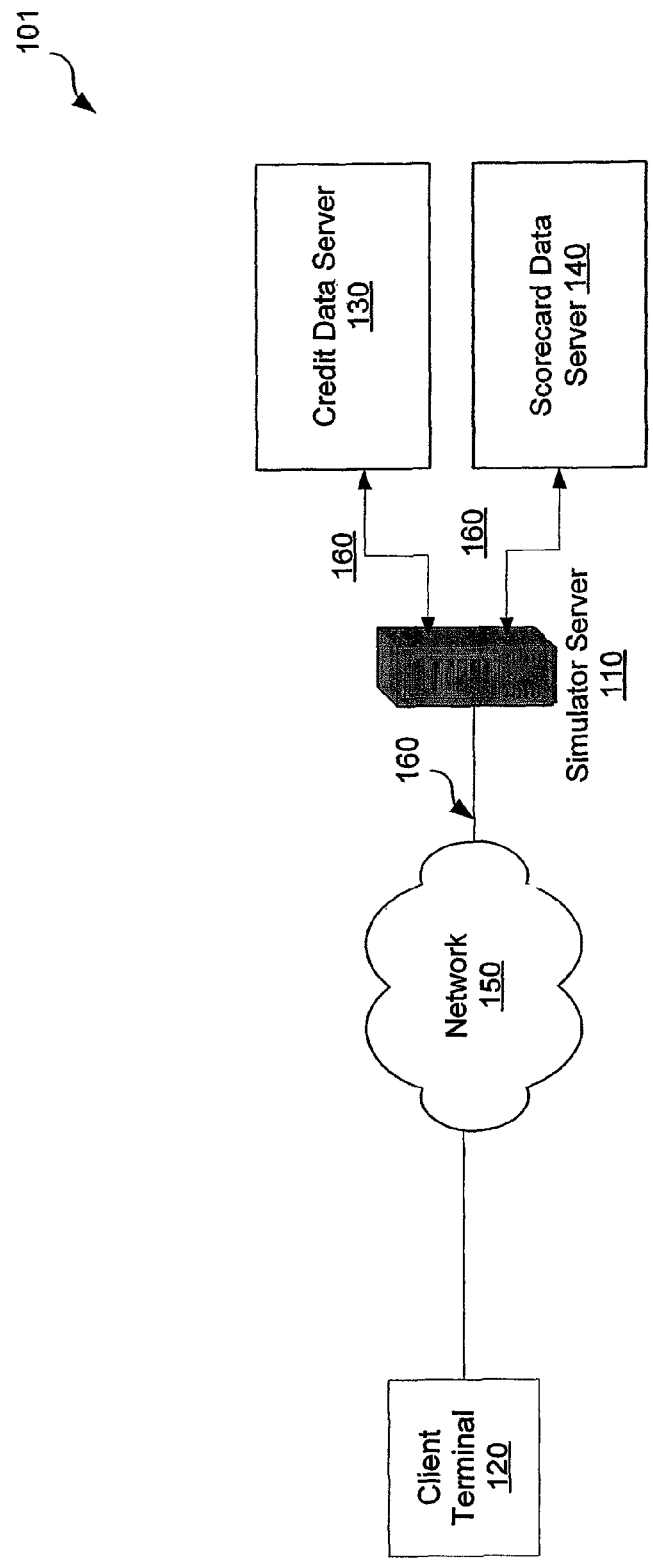
FIG. 1 illustrates a block diagram overview of one embodiment of a system for simulating a credit-worthiness score based on initial and modified credit data.

Financial risk scores, along with their associated risk models, are designed to predict future consumer financial behaviors such as delinquency, bankruptcy, and profitability. One example of a financial risk score is the credit-worthiness score. While the invention can be used in conjunction with any financial risk score, the embodiments described below address credit-worthiness scores in particular. Specifically, a system and method for simulating a credit-worthiness score based on initial and modified credit data is described.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to an apparatus for performing the operations herein. This apparatus is specially constructed for the required purposes, or it comprises a general-purpose computer selectively activated or reconfigured by a computer program stored in the computer. Such a computer program is stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems are used with programs in accordance with the teachings herein, or more specialized apparatus are constructed to perform the required method steps. The required structure for a variety of these systems will appear from the description below. In addition, the present invention is not described with reference to any particular programming language. It will be appreciated that a variety of programming languages may be used to implement the teachings of the invention as described herein.

Overview

FIG. 1 illustrates a block diagram overview of one embodiment of a system 101 for simulating a credit-worthiness score based on initial and modified credit data. Generally, system 101 includes a simulator server 110, a client terminal 120, a credit data server 130, and a scorecard data server 140. Client terminal 120 is a general-purpose computer capable of running a web browser or other user-interface program or it is a limited-function electronic device configured to communicate with the simulator server 110. The simulator server 110 is any general-purpose computer configured to serve web pages or communicate with the client terminal 120. It may be advantageous to utilize a general-purpose computer configured to be an information-server capable of handling communications with multiple client terminals 120. Likewise, credit data server 130 and scorecard data server 140 are general-purpose computers configured to provide remote access to stored data.

The client terminal 120 and the data servers 130 and 140 are each coupled to the simulator server 110. The client terminal 120 and simulator server 110 are configured to allow a consumer using the client terminal to communicate interactively with the simulator server 110. In a preferred embodiment, the client terminal 120 is communicatively coupled to the simulator server 110 via a communications network 150, such as the Internet. This facilitates the centralization and segmentation of the system 101 for ease of maintenance and accessibility.

System 101 operates as follows. A consumer who wishes to learn how credit data affects credit-worthiness scores uses client terminal 120 to communicate with simulator server 110. The simulator server 110 retrieves scorecard data from the scorecard data server 140 such as via a LAN 160. The scorecard data server 140 contains one or more simulator scorecards for use by the simulator server 110. Generally, each scorecard provides a metric for the simulator server 110 to weigh information contained in the retrieved credit data to simulate the credit-worthiness score. Scorecards represent these weights as coefficients. In a preferred embodiment, the simulator server 110 uses a simulator scorecard that simulates the scoring process of the credit industry's generic scoring method. In an alternate embodiment, the consumer is able to select which scoring method to simulate and thus the scorecard data server 140 includes additional simulator scorecards for each scoring method.

The simulator server 110 also communicates with the credit data server 130 to obtain credit data such as via a LAN 160. The credit data includes information related to a consumer's credit-worthiness. In a preferred embodiment, this information includes credit data that is generally collected by a credit bureau. However, one skilled in the art will recognize that other data may either replace or supplement the credit data in generating and simulating the credit-worthiness score.

In one embodiment, the credit data server 130 holds credit bureau data. In this embodiment, the consumer provides information sufficient to identify himself (hereinafter "consumer identification data"). In one embodiment, the consumer identification data includes the consumer's name, social security number, current address, or any other distinguishing data for ensuring that the correct credit data is associated with the consumer. In a preferred embodiment, the consumer identification data needs to be entered only once and is stored in a profile on the system 101. During subsequent uses, the consumer signs into the system 101 to have the profile provide the consumer identification data. The profile would be provided to only those users who possess the correct security credentials, such as passwords or access cards. In this embodiment, the profile would be stored on a computer-readable medium. The computer-readable medium could be stored in the client terminal 120, in the simulator server 110, or elsewhere in system 101.

The client terminal 120 transmits the consumer identification data to the simulator server 110. The simulator server 110 then transmits the consumer identification data to the credit data server 130. The credit data server 130 then returns credit data corresponding to the particular consumer. While this embodiment enables the consumer to experiment with his own actual credit data, it is not always the preferred embodiment because pulling actual credit data can cost money and adversely affect one's credit rating.

In another embodiment, the credit data server 130 holds census bureau data based on the average consumer. In this embodiment, the consumer does not provide any information about himself. Although credit data transmitted from the credit data server 130 to the simulator server 110 is not specific to the consumer, it provides a starting point for the consumer to explore the effect that credit data has on a credit-worthiness score.

In yet another embodiment, the credit data server 130 also holds census bureau data, but the consumer provides some information about himself. In one embodiment, the information corresponds to the categories of information stored by the census bureau, such as location, age, and profession. The client terminal 120 transmits this information to the simulator server 110. The simulator server 110 then transmits the information to the credit data server 130. The credit data server 130 then returns credit data based on the information. This embodiment allows the credit data returned to be more relevant to the specific consumer while not experiencing the disadvantages of pulling the consumer's actual credit report.

Figure 6A:
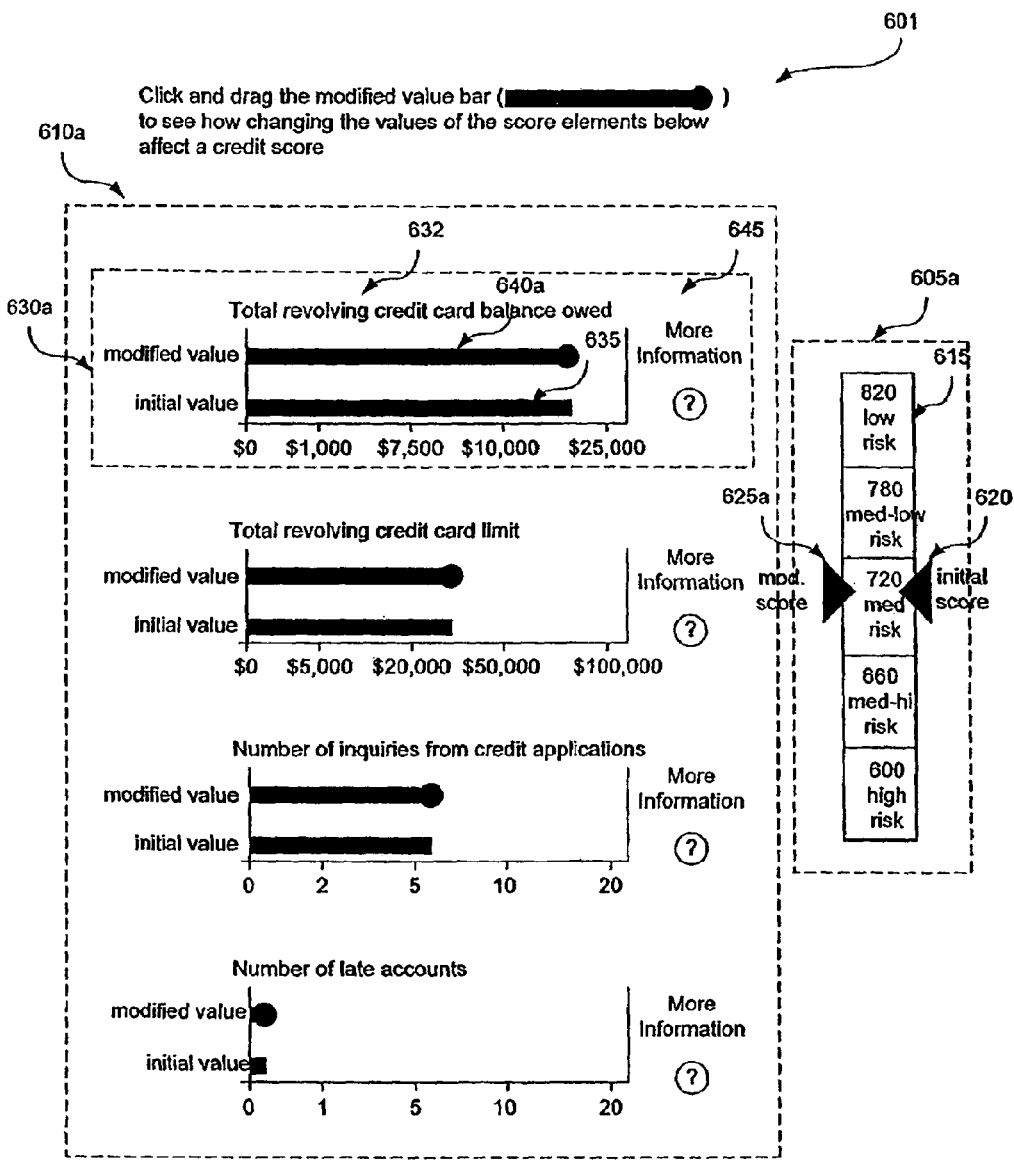
FIG. 6a illustrates one embodiment of the user interface shown on a client terminal.
Figure 6B:
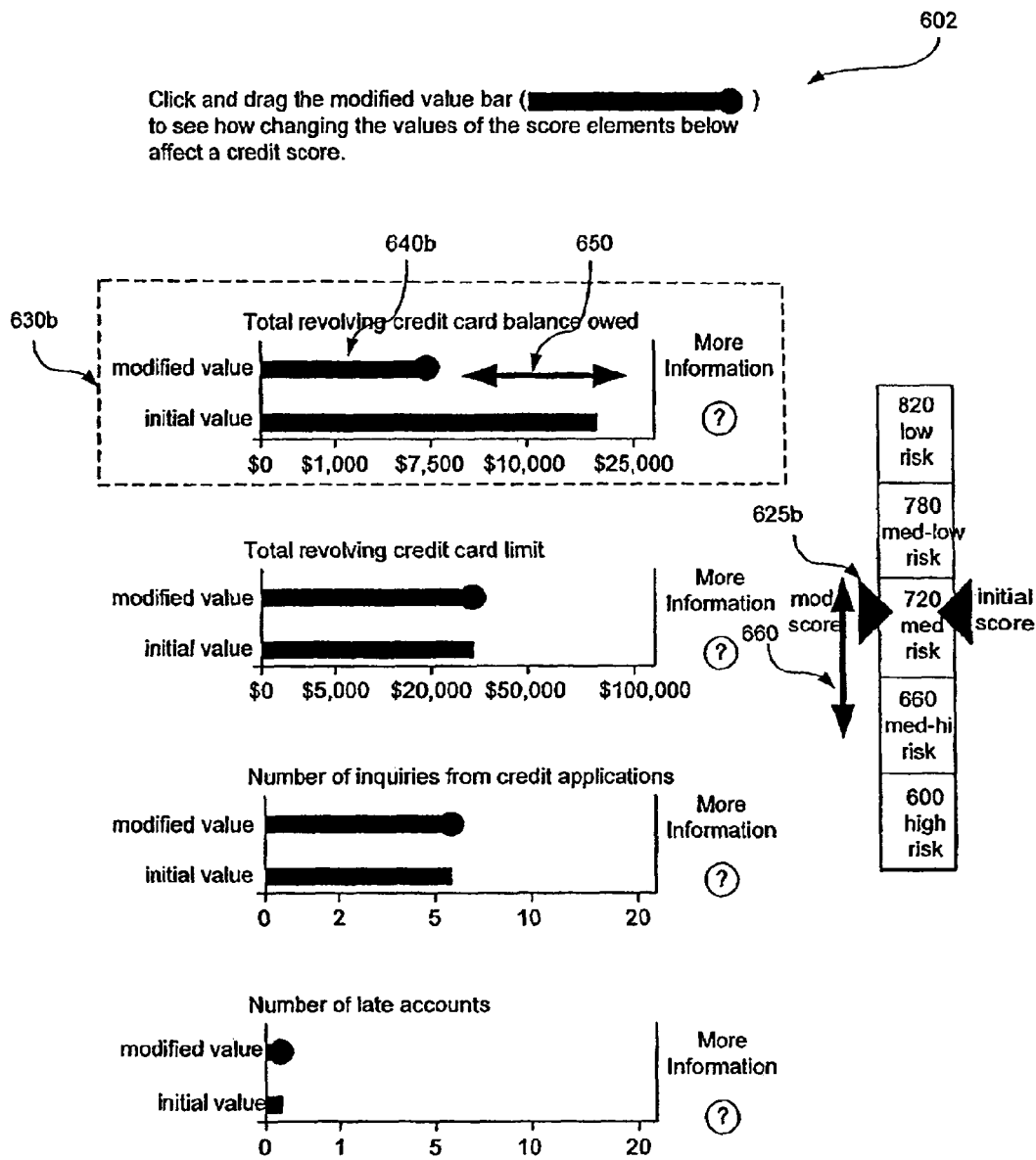
FIG. 6b illustrates the embodiment depicted in FIG. 6a showing modified data being entered.
Figure 6C:
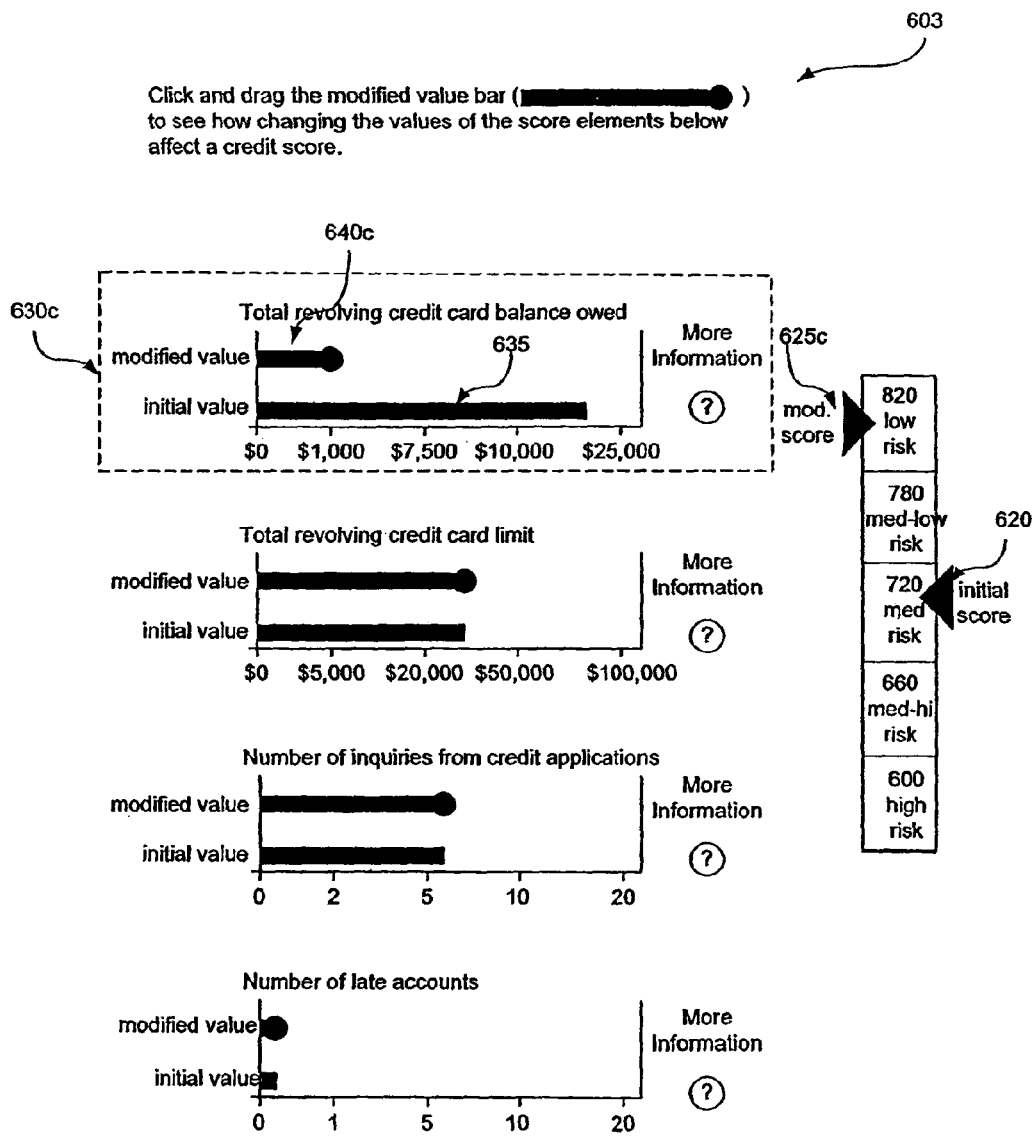
FIG. 6c illustrates the embodiment depicted in FIG. 6a showing the resultant score simulation.

Once the simulator scorecard and credit data have been obtained, the simulator server 110 uses the simulator scorecard and credit data to calculate an initial simulated score. The simulator server 110 then outputs this score to the client terminal 120. In one embodiment, the score is a simple numerical value, such as is shown in FIGS. 6a-6c (described below). In another embodiment, the score is a value representing a characteristic of a financial transaction, such as a loan limit or a loan percentage rate. Many other forms of scores are also possible.

The consumer interactively adjusts the values of the initial credit data elements via the client terminal 120. The client terminal 120 then transmits the modified credit data to the simulator server 110. The simulator server 110 receives the modified credit data and substitutes the modified credit data for the corresponding initial credit data retrieved from the credit data server 130. The simulator server 110 then recalculates a credit-worthiness score based on the metric of the selected scorecard data and the modified credit data. In one embodiment, the recalculated score is output alongside the initial score to the client terminal 120 to allow the consumer to interactively compare the effect of the changes on the credit-worthiness score.

In a preferred embodiment, the simulator server 110 communicates with the client terminal 120 via a web page. This web page is served by the simulator server 110 and typically runs on the client terminal 120. The web page allows for user entry of the consumer identification data, the modified data, and the additional consumer information. The client terminal 120 also receives the simulated score from the simulator server 110 and displays it on the web page. In a preferred embodiment, the entry of the modified data is interactive, allowing the simulated score to be recalculated dynamically by the simulator server 110 responsive to changes in the initial data, without requiring the user to actually "submit" the changes to the simulator server 110. The user interface for the client terminal 120 will be discussed in greater detail below.

One skilled in the art will recognize that other communication topologies exist that fall within the spirit of the invention. For example, in an alternate embodiment, the simulator server 110, credit data server 130, scorecard data server 140, and client terminal 120 all reside or originate locally in one general-purpose computer system. Furthermore, the present invention advantageously simulates credit scoring methods currently used in the credit industry to aid the consumer in determining the best manner in which to improve his credit. As the credit industry changes scoring methods, the present invention may be adapted to these new methods as well.

Simulator Server

Figure 2:
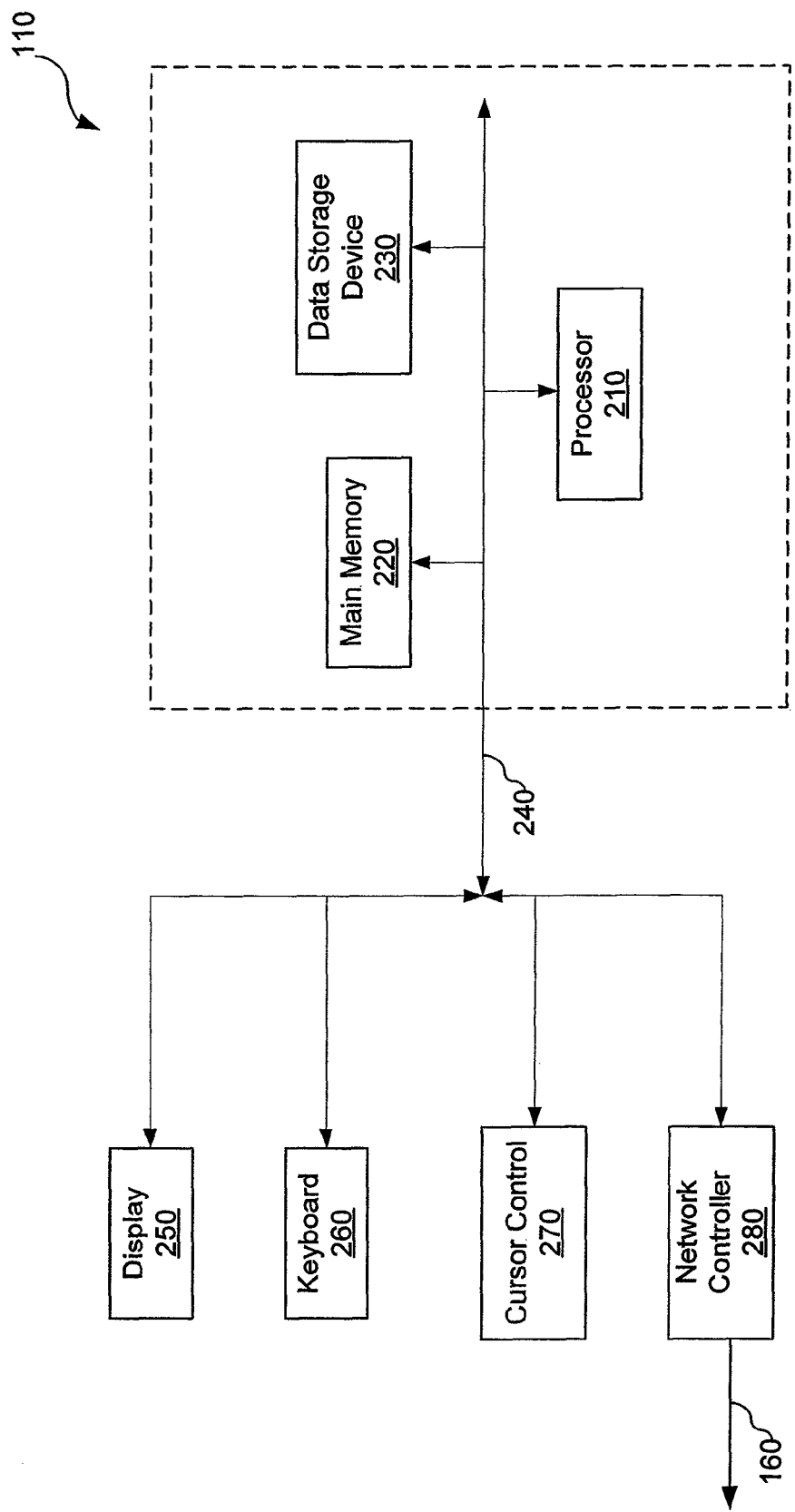
FIG. 2 illustrates a block diagram of a preferred embodiment of the architecture of the simulator server.

FIG. 2 illustrates a block diagram of a preferred embodiment of simulator server 110. Simulator server 110 preferably includes a processor 210, a main memory 220, a data storage device 230, and a network controller 280, all of which are communicatively coupled to a system bus 240.

Processor 210 processes data signals and comprises various computing architectures including a complex instruction set computer (CISC) architecture, a reduced instruction set computer (RISC) architecture, or an architecture implementing a combination of instruction sets. Although only a single processor is shown in FIG. 2, multiple processors may be included.

Main memory 220 stores instructions and/or data that are executed by processor 210. The instructions and/or data comprise code for performing any and/or all of the techniques described herein. Main memory 220 is preferably a dynamic random access memory (DRAM) device, a static random access memory (SRAM) device, or some other memory device known in the art.

Data storage device 230 stores data and instructions for processor 210 and comprises one or more devices including a hard disk drive, a floppy disk drive, a CD-ROM device, a DVD-ROM device, a DVD-RAM device, a DVD-RW device, a flash memory device, or some other mass storage device known in the art.

Network controller 280 links simulator server 110 to a network 150 that may include multiple processing systems. In a preferred embodiment, the credit data server 130, the scorecard data server 140, and the client terminal 120 are also connected to the network 150. The network 150 comprises a local area network (LAN), a wide area network (WAN) (e.g., the Internet), and/or any other interconnected data path across which multiple devices may communicate.

System bus 240 represents a shared bus for communicating information and data throughout simulator server 110. System bus 240 represents one or more buses including an industry standard architecture (ISA) bus, a peripheral component interconnect (PCI) bus, a universal serial bus (USB), or some other bus known in the art to provide similar functionality.

Additional components that may be coupled to simulator server 110 through system bus 240 include a display device 250, a keyboard 260, and a cursor control device 270. Display device 250 represents any device equipped to display electronic images and data to a local user or maintainer. Display device 250 is a cathode ray tube (CRT), a liquid crystal display (LCD), or any other similarly equipped display device, screen, or monitor. Keyboard 260 represents an alphanumeric input device coupled to simulator server 110 to communicate information and command selections to processor 210. Cursor control device 270 represents a user input device equipped to communicate positional data as well as command selections to processor 210. Cursor control 270 includes a mouse, a trackball, a stylus, a pen, cursor direction keys, or other mechanisms to cause movement of a cursor.

It should be apparent to one skilled in the art that simulator server 110 includes more or fewer components than those shown in FIG. 2 without departing from the spirit and scope of the present invention. For example, simulator server 110 may include additional memory, such as, for example, a first or second level cache or one or more application specific integrated circuits (ASICs). As noted above, simulator server 110 may be comprised solely of ASICs. In addition, components may be coupled to simulator server 110 including, for example, image scanning devices, digital still or video cameras, or other devices that may or may not be equipped to capture and/or download electronic data to/from simulator server 110.

Figure 3:
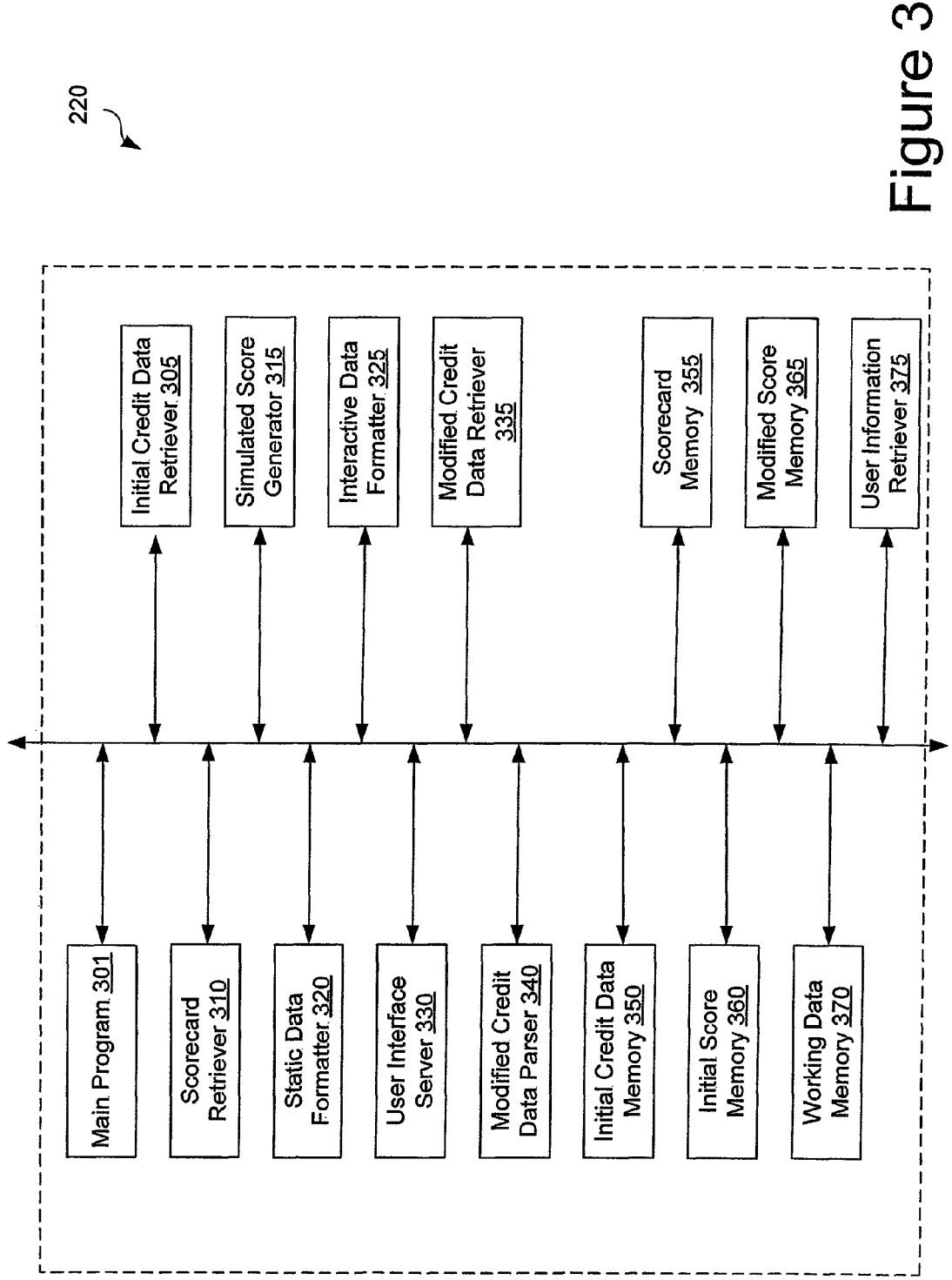
FIG. 3 illustrates a more detailed block diagram of the contents of the memory unit in FIG. 2.

FIG. 3 is a block diagram of memory unit 220. Generally, memory unit 220 comprises several code modules for simulating a credit-worthiness score, responding to consumer identification data, and presenting the user interface for output on client terminal 120. Specifically, the code modules in memory unit 220 include: a main program 301, an initial credit data retriever 305, a scorecard retriever 310, a simulated score generator 315, a static data formatter 320, an interactive data formatter 325, a user interface server 330, a modified credit data retriever 335, a modified credit data parser 340, and a user information retriever 375.

Memory unit 220 also contains several memory storage areas for storing various bytes of data required by the operation of the code modules 301, 305, 310, 315, 320, 325, 330, 335, and 340. Specifically, memory unit 220 includes an initial credit data memory 350, a scorecard memory 355, an initial score memory 360, a modified score memory 365, and a working data memory 370.

All code modules and memories 305, 310, 315, 320, 325, 330, 335, 340, 350, 355, 360, 365, 370, and 375 are communicatively coupled with main program 301. Main program 301 centrally controls the operation and process flow of simulator server 110, transmitting instructions and data to as well as receiving data from each code module and memory 305, 310, 315, 320, 325, 330, 335, 340, 350, 355, 360, 365, 370, and 275. The operation of memories 350, 355, 360, 365, and 370 and code modules 301, 305, 310, 315, 320, 325, 330, 335, 340, and 375 in memory unit 220 is best shown in FIGS. 4a-4c.

Figure 4A:
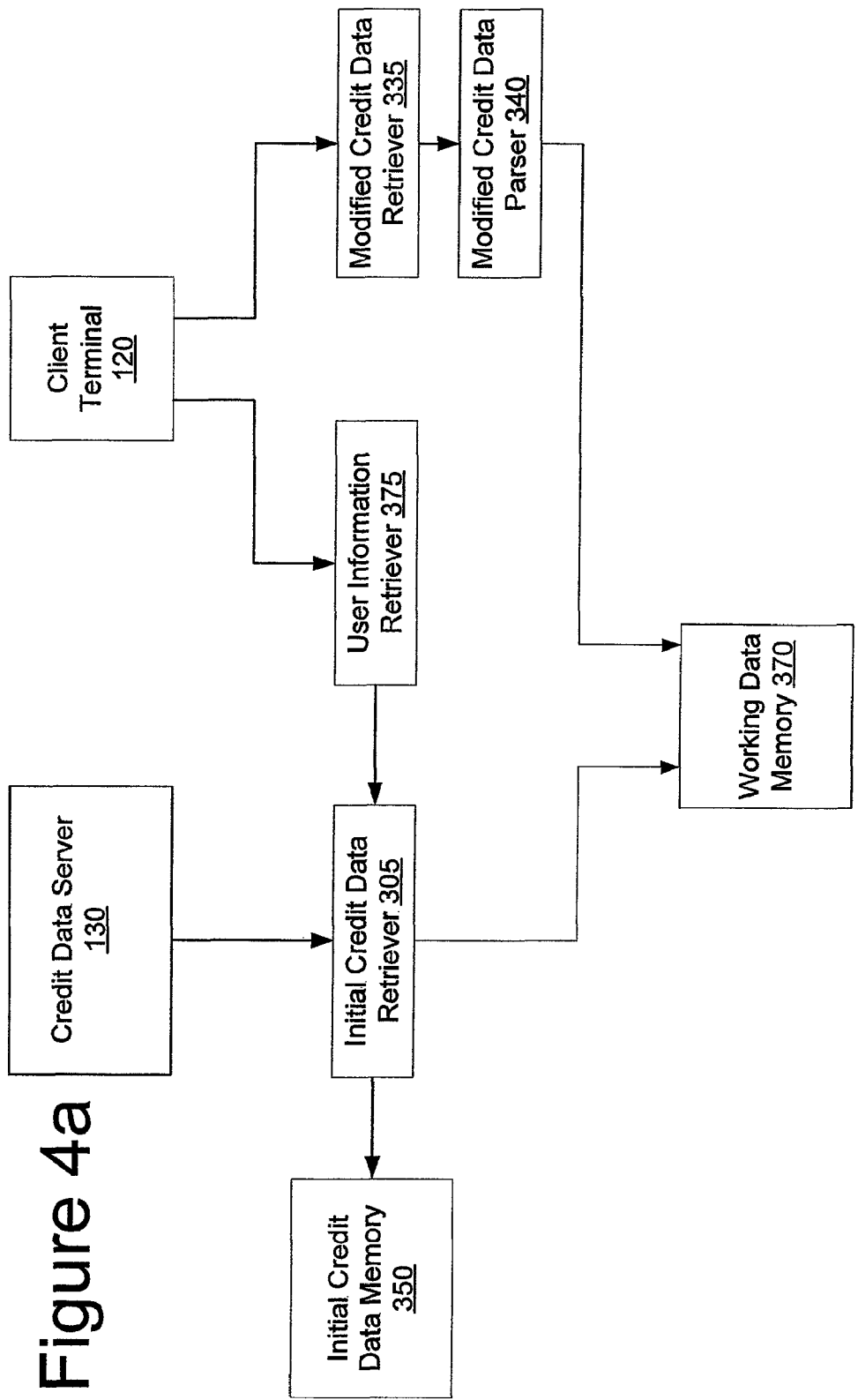
FIG. 4a illustrates how data gets into the working data memory.
Figure 4C:
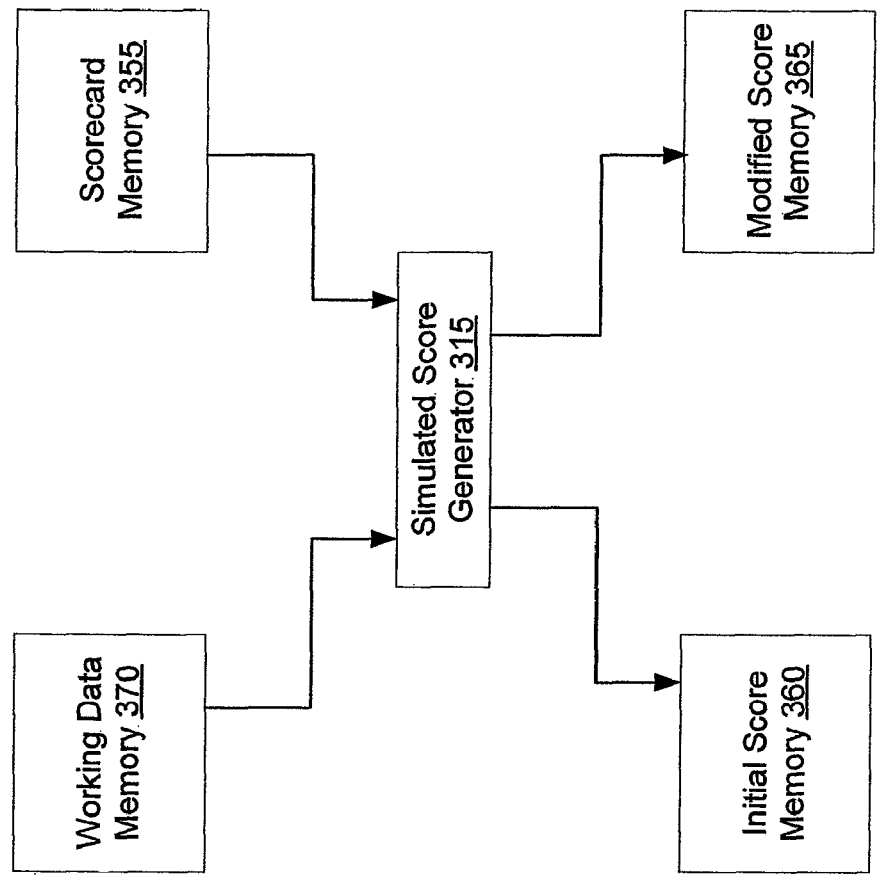
FIG. 4c is a diagram of the data flow through the simulated score generator.
Figure 4B:
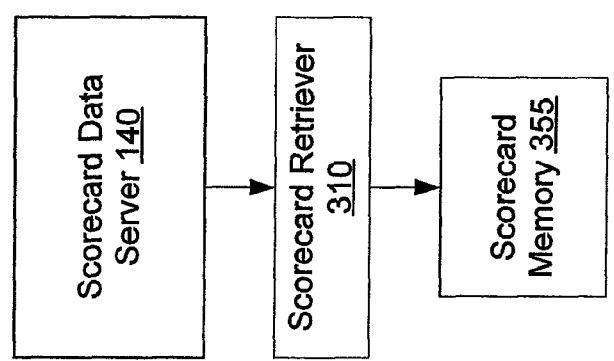
FIG. 4b illustrates how data gets into the scorecard memory.

FIG. 4a illustrates how data gets into the working data memory 370. Initially, the data stored in working data memory 370 comes from the credit data server 130 as follows. The credit data server 130 is coupled to the initial credit data retriever 305. The credit data server 130 receives a query from the initial credit data retriever 305. Based on information in the query, the credit data server 130 transmits credit data to the initial credit data retriever 305.

In one embodiment, there is a user information retriever 375 that is coupled to the client terminal 120 and the initial credit data retriever 305. When the user enters information about himself at client terminal 120 (either information sufficient to identify himself or other information such as location or salary), client terminal 120 transmits this information to the user information retriever 375. The user information retriever 375 then transmits this information to the initial credit data retriever 305. The initial credit data retriever 305 uses this information to refine its query to the credit data server 130, as described above.

The initial credit data retriever 305 is coupled to the credit data server 130, the initial credit data memory 350, and the working data memory 370. Once the initial credit data retriever 305 has received credit data from the credit data server 130, the initial credit data retriever 305 transmits this credit data to the initial credit data memory 350 and the working data memory 370.

The initial credit data memory 350 is coupled to the initial credit data retriever 305. Once the initial credit data memory 350 has received credit data from the initial credit data retriever 305, the initial credit data memory 350 stores this credit data. The working data memory 370 is also coupled to the initial credit data retriever 305 (in addition to being coupled to the modified credit data parser 340, as described below). Once the working data memory 370 has received credit data from the initial credit data retriever 305, the working data memory 370 stores this credit data.

Since the working data memory 370 now has initial credit data, simulated score generator 315 (see FIG. 4c) outputs the initial credit score. This score is then stored in initial score memory 360, as described in FIG. 4c.

When a user modifies the initial credit data, the entire set of credit data (both modified data and initial data, if any) is stored in working data memory 370 as follows. The client terminal 120 is coupled to the modified credit data retriever 335. The user uses client terminal 120 to modify the initial credit data. The client terminal 120 transmits the modified credit data to modified credit data retriever 335.

The modified credit data retriever 335 is coupled to the client terminal 120 and the modified credit data parser 340. Once the modified credit data retriever 335 has received the modified credit data from the client terminal 120, it transmits the data to the modified credit data parser 340. The modified credit data parser 340 is coupled to the modified credit data retriever 335 and the working data memory 370. Once the modified credit data parser 340 has received the modified credit data from the modified credit data retriever 335, it transmits the modified credit data to the working data memory 370. The credit data values in working data memory 370 that the user modified are thereby set to the new (modified) values, while the unchanged data (if any) remains at the same initial values. Since the working data memory 370 now has modified credit data, simulated score generator 315 recalculates the credit score and outputs it. This score is then stored in modified score memory 365, as described in FIG. 4c.

FIG. 4b illustrates how data gets into the scorecard memory 355. The data stored in scorecard memory 355 comes from the scorecard data server 140 as follows. The scorecard data server 140 is coupled to the scorecard retriever 310. The scorecard data server 140 receives a request for a scorecard from scorecard retriever 310. Based on information in the request, scorecard data server 140 transmits scorecard data to scorecard retriever 310.

Scorecard retriever 310 is coupled to scorecard data server 140 and scorecard memory 355. Once scorecard retriever 310 has received scorecard data from the scorecard data server 140, the scorecard retriever 310 transmits this scorecard data to the scorecard memory 355.

The scorecard memory 355 is coupled to the scorecard retriever 310. Once the scorecard memory 355 has received scorecard data from the scorecard retriever 310, the scorecard memory 355 stores this scorecard data.

FIG. 4c is a diagram of the data processing through the simulated score generator 315. Simulated score generator 315 is coupled to working data memory 370, scorecard memory 355, initial score memory 360, and modified score memory 365. Simulated score generator 315 takes as inputs data in the working data memory 370 and data in the scorecard memory 355. Simulated score generator 315 then calculates a credit-worthiness score using the scorecard data in the scorecard memory 355 and the credit data in the working data memory 370. This score is then transmitted to either initial score memory 360 or modified score memory 365, depending on whether the credit data in working data memory 370 was initial credit data or contained some modified credit data, respectively. Initial score memory 360 or modified score memory 365 then stores the received score.

Static data formatter 320 and interactive data formatter 325 prepare the user interface that is shown on client terminal 120 via user interface server 330. Static data formatter 320 is coupled to initial credit data memory 350, initial score memory 360, and modified score memory 365. Static data formatter 320 receives data from these three memories and formats that data. Interactive data formatter 325 is coupled to initial credit data memory 350 and working data memory 370. Interactive data formatter 325 receives data from these two memories and formats the data. User interface server 330 is coupled to static data formatter 320 and interactive data formatter 325. User interface server 330 receives as inputs formatted data from both the static data formatter 320 and the interactive data formatter 325 and transmits to client terminal 120 a single integrated user interface.

Start-Up/First Pass

Figure 5:
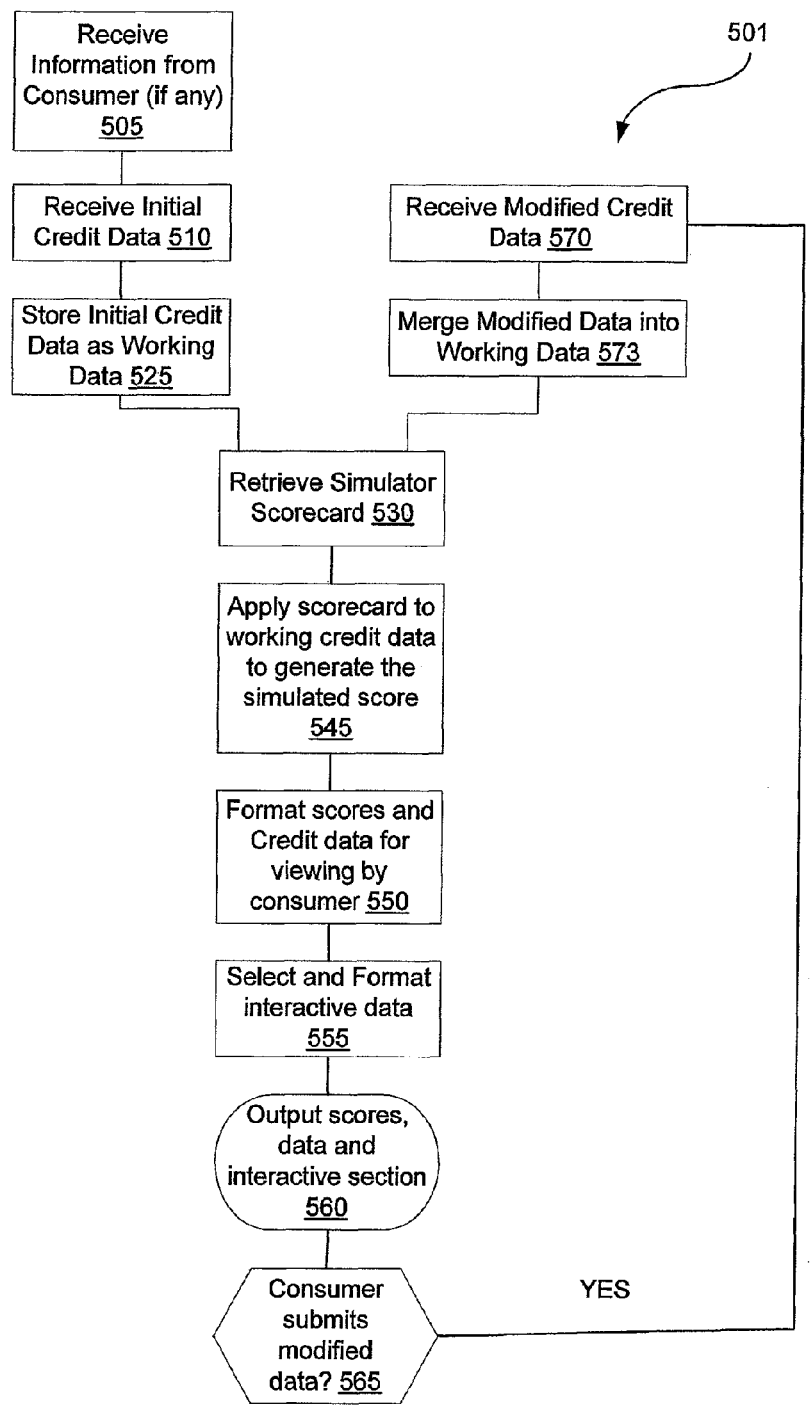
FIG. 5 illustrates a flow chart of a preferred embodiment of a method for simulating a credit-worthiness score based on initial and modified credit data.

The general method implemented by main program 301 is further illustrated in FIG. 5. A consumer accesses system 101 via client terminal 120 in order to learn how credit data affects credit-worthiness scores. The first pass of the system 101 provides the consumer with an initial simulated score. This score will be based on credit data and can vary depending on whether the credit data comes from a credit bureau, the census bureau, or another source. The system 101 then allows the consumer to submit modified credit data to view how changing credit data affect credit-worthiness scores.

In one embodiment, the consumer provides no information to the system. In another embodiment, he provides either consumer identification data or some information (but not enough to identify himself). If the consumer provides any information, the client terminal 120 transmits the information to the simulator server 110, and the information is received 505. Initial credit data retriever 305 then uses this information (if any) to obtain 510 initial credit data from credit data server 130. Credit data retriever 305 then stores 525 the initial credit data in working data memory 370 as described in FIG. 4b.

Next, the scorecard retriever 310 retrieves 530 the simulator scorecard as described in FIG. 4c. The simulated score generator 315 then applies the scorecard coefficients stored in scorecard memory 355 to the credit data stored in working data memory 370 to generate 545 an initial simulated credit-worthiness score.

In a preferred embodiment, the set of elements chosen for inclusion in the score calculation is smaller than the total set of elements present in the credit data. By working with a smaller set of data elements, the simulator server 110 more quickly calculates the simulated score, providing a response almost instantly. However, the returned score may not be absolutely accurate since it is based on a smaller subset of credit data. The simulator scorecard approximates an industry-standard credit score based on the full set of credit data while using a smaller subset of the data.

In the preferred embodiment, the set of elements is chosen to reflect the data that most strongly influences the consumer's credit score, thus providing the consumer with the best idea of which aspects of his credit data he should try to improve first. In one embodiment, these elements are predetermined and the set is constant across all consumers. In another embodiment, the system determines which elements are most influential in a particular consumer's credit score and selects those elements. One method for making such a determination includes examining the weighted value of all the received data elements and choosing a set including the highest valued elements. The system 101 may select only the elements already existing in the received credit data or, alternatively, may look for possible large swings in the modified score by introducing a new type of data element. Examples of such a data element include salary level and ownership of major assets. For example, the modified data might include ownership of a home, while the initial data did not. One skilled in the art will recognize other methods for determining the set of data elements to be included in the scoring procedure.

Once the score is generated 545, the simulated score generator 315 stores the simulated score in both the initial score memory 360 and in the modified score memory 365. By storing the score in both memories 360 and 365, the static data formatter 320 is able to operate in the same manner regardless of whether the system is in the first pass or another pass for any given consumer. This is done in the preferred embodiment so that the user interface may display a modified value and an initial value that are the same when the interface is first presented. However, in an alternate embodiment, the simulated score generator 315 could store the simulated score just in the initial score memory 360. This would result in the user interface displaying only an initial value until the user has input modified data and the credit score was recalculated for the modified data at least one time.

In subsequent passes, the simulated score generator 315 will apply the scorecard coefficients to a set of modified credit data. As discussed above, this will be a direct result of the consumer's submission of modified data. As will be discussed in further detail below, the data in working data memory 370 will be overwritten with the modified credit data, and the simulated score generator 315 will recalculate the credit-worthiness score. However, unlike in the first pass, the recalculated score will be stored only in the modified score memory 365, not in the initial score memory 360. This will preserve the initial score in the initial score memory 360 for output to the client terminal 120.

Static formatter 320 retrieves the credit data from initial credit data memory 350 and both scores from initial score memory 360 and modified score memory 365 and formats 550 the information for output to the consumer via user interface server 330 and the client terminal 120. Interactive data formatter 325 selects and formats 555 various elements from the initial credit data memory 350 and the working data memory 370 for inclusion in the user interface presented to the consumer via user interface server 330 to client terminal 120.

As discussed above, in one embodiment, the simulator server 110 utilizes only a subset of the available credit data for a consumer when calculating the simulated score. As discussed above, this helps the score simulator more quickly calculate the updated scores due to fewer possible variables. In another embodiment, the interactive data formatter 325 presents only a subset of the data to the consumer for modification. In this way, the consumer is presented with the most common factors affecting credit-worthiness, while the simulator server 110 bases its calculations on additional credit data that is not made available to the consumer for modification.

Once the scores, data, and user interface have been formatted 550 and the interactive data has been selected and formatted 555, the user interface server 330 combines the information and outputs 560 the combined user interface to the client terminal 120 for viewing and interaction by the consumer. Once the information has been output 560, the system waits 565 for the consumer to submit modified credit data via the user interface.

Processing Modified Data

Once the consumer submits the modified credit data, it is received 570 by the modified credit data retriever 335 and passed to the modified credit data parser 340. The modified credit data parser 340 merges 573 the received (modified) credit data with the credit data stored in working data memory 370 and stores the resulting data into the working data memory 370. In this embodiment, the data in initial credit data memory 350 remains unchanged once it is stored during the first pass. This allows the consumer to compare the initial credit data with the newly input modified credit data and see the resulting change in the credit score.

In an alternate embodiment, after the consumer submits modified credit data, but before the modified data is merged with the data in working data memory 370, the data in working data memory 370 is stored in initial credit data memory 350. In addition, the data in modified score memory 365 is stored in initial score memory 360. In this embodiment, the data in initial credit data memory 350 and initial score memory 360 is the data used in and calculated by the previous pass of the system 101, respectively. In other words, this embodiment allows the consumer to compare the previous pass credit data with the newly input modified credit data and see the resulting change in the credit score.

The scorecard retriever 310 retrieves 530 the simulator scorecard as described in FIG. 4c. The simulated score generator 315 then applies the scorecard coefficients stored in scorecard memory 355 to the credit data stored in working data memory 370 to generate 545 a recalculated simulated credit-worthiness score. The recalculated score is then stored in modified score memory 365 for use by the static data formatter 320.

Static data formatter 320 formats 550 the initial score stored in initial score memory 360, the newly recalculated score stored in modified score memory 365, and the credit data stored in the initial credit data memory 350 in a similar fashion as during the first pass of the system. The interactive data formatter 325 likewise receives the new working data and the credit data from their respective memories 370 and 350 and formats 555 the user interface to reflect the consumer's latest submission of modified credit data as stored in the working data memory 370.

Once the user interface server 330 outputs 560 the information to the client terminal 120, the system 101 again waits 565 to see whether the consumer submits additional modified data. If new modified data is submitted, the system 101 begins the process again with the modified data retriever 335 receiving 570 the modified credit data.

FIGS. 6a-6c illustrate a preferred embodiment of the user interface transmitted to the client terminal 120. FIG. 6a illustrates a preferred embodiment of the user interface 601 outputted 560 during the first pass of the system 101, before modified data has been submitted. The first pass user interface 601 includes a score comparison section 605a and an interactive section 610a.

The score comparison section 605a includes bar graph 615 representing the range of possible credit scores. In the embodiment illustrated in FIGS. 6a-6c, the score is a simple numerical value, and a higher score reflects a higher degree of credit-worthiness. In another embodiment, the score is a value representing a characteristic of a financial transaction, such as a loan limit or a loan percentage rate. Many other forms of scores are also possible.

Score comparison section 605a also includes an indicator 620 showing the consumer's initial credit-worthiness, and a second indicator 625a, which shows the consumer's recalculated credit-worthiness score based on submitted modified data. Note that during the first pass, the two indicators 620, 625a point to the same value. As will be discussed below, once modified credit data has been submitted by the consumer, the second indicator 625a will move to a different value allowing the consumer to both numerically and visually compare the effects of changing the data.

While the score comparison section 605a has been illustrated as including a bar-graph 615 and two indicators 620, 625a showing the relative positions of the scores, one skilled in the art will recognize that other graphical or textual methods exist by which to enable the consumer to compare his initial score with a recalculated score.

The interactive section 610a includes several elements relating to selected data elements in the received credit data. As illustrated, these include the total revolving credit card balance owed 630a, the total revolving credit card limit, the number of inquires from credit applications, and the number of accounts the consumer is currently late in paying. This discussion will focus on the first element 630a, the total revolving credit card balance owed, when describing the operation of the preferred embodiment of the first pass display 601. It will be apparent to one skilled in the art that the remaining elements in the interactive section 610a may operate in a similar manner. Likewise, it will be apparent to one skilled in the art that additional or different data elements may be included in the interactive section 610a.

Element 630a includes a legend 632 identifying the nature of the data element displayed and providing a scale by which to interpret the remaining parts of first element 630a. First element 630a also includes an initial value indicator 635, which reflects the value of the corresponding data from the retrieved credit data, and a graphical slider 640a whose value initially matches the initial value indicator 635, but may subsequently be manipulated by the consumer to submit the modified credit data. Finally, first element 630a includes an information point 645 where the consumer may access information or help regarding the associated data element or regarding the operation of the client terminal 120. While the preferred embodiment utilizes a graphical slider element, one skilled in the art will recognize that various methods may exist by which the consumer may be informed of their initial data values and may adjust the modified values. One such alternative includes a text-based system wherein the consumer simply types in a new value in for the element in order to submit the modified credit data.

FIG. 6b illustrates the user interface 602 while the consumer is submitting modified data through client terminal 120. While the user interface 602 includes the same elements as the first pass display 601, the second indicator 625b and the data element 630b have been modified to reflect the changes submitted by the consumer.

As illustrated, the consumer is in the process of adjusting the value for element 630b. The adjustment is accomplished by clicking on the graphical slider 640b and dragging it in a horizontal direction, as indicated by arrow 650. It should be understood that any one of the multiple elements (e.g., total revolving credit card balance, total revolving credit card limit, number of credit applications, and number of late accounts) affecting credit could be modified in a similar manner. Note that arrow 650 is not part of the user interface; it is included in FIG. 6b in order to show the movement of graphical slider 640b. In a preferred embodiment, the second indicator 625b will move in a vertical direction as indicated by arrow 660 (also not part of the user interface) in response to the movement in the graphical slider 640b.

In another preferred embodiment, the score generation is optimized to allow for automatic updating of the second indicator 625b even before a final modified value for element 630b is chosen. More specifically, as the user selects and drags the modified value bar, the other elements of the user interface 601 are modified, updated and displayed before the user releases the selection of the value bar. As illustrated, the lower the value chosen for the modified credit data in element 630b, the higher the credit score as indicated by the second indicator 625b. In another embodiment, the consumer may adjust the modified value and then "submit" the value, by clicking on a button, for example, before the second indicator 625b will update. However, it is advantageous to provide the near-instant update for the second indicator 625b as it allows the consumer to quickly understand how changing credit data affects one's credit-worthiness score.

FIG. 6c illustrates the user interface 603 after the consumer has selected final values for his modified data. As noted above, in one embodiment, user interface 603 reflects the user interface after the consumer has "submitted" the modified value. While the user interface 603 includes the same elements as the first pass display 601, the second indicator 625c and data element 630c have been modified to reflect the changes submitted by the consumer.

As illustrated, the consumer has adjusted the value of first element 630c to explore the ramifications of a lower revolving balance owed on his credit cards. To this effect, the graphical slider 640c has been dragged to the left to select a value of approximately $1,000. Compare this with the graphical slider's original position of approximately $20,000, which is also the position of the initial value indicator 635. As discussed with respect to FIGS. 4 and 5, once the value for the total debt is submitted as modified credit data, the modified score generator 345 recalculates the score and the static data formatter 320 prepares the new position for the second indicator 625c for display in the user interface 603. As discussed above, the recalculation and display of the new score may have occurred in near-real time, reflecting the changes as the consumer dragged the graphical slider, or the recalculation may have required the consumer to affirmatively submit the newly selected modified data. As illustrated, the modified reduction in debt to $1,000 has raised the recalculated score indicated by second indicator 625c to a higher value than the initial score indicated by indicator 620. Thus by selecting a lower debt value via first element 630c, the consumer may learn that a score improvement may be had by paying off debt and lowering his actual total revolving credit card balance owed.

Although the invention has been described in considerable detail with reference to certain embodiments thereof, other embodiments are possible as will be understood to those skilled in the art. For example, other embodiments may address financial risk scores other than credit-worthiness scores. These financial risk scores can predict future consumer financial behaviors such as delinquency, bankruptcy, and profitability.

What is claimed is:

1. A method of presenting a user with a simulated credit score, the method being performed on computing hardware, the method comprising:

maintaining, in computer-readable storage, a credit information data structure indicative of credit-related information associated with a consumer;

calculating a first credit score based on the credit information data structure;

transmitting, to a client computer, user interface data configured to cause the client computer to display a user interface including a graphical representation of the first credit score, the user interface further including one or more adjustable sliders configured to enable a user of the client computer to adjust one or more credit-related parameters, the user interface data further including executable code configured to transmit score simulation request data in response to the user adjusting one or more of the adjustable sliders;

receiving, from the client computer, score simulation request data including indications of one or more credit-related parameter adjustments indicated by the adjusting of the one or more of the adjustable sliders;

calculating a second credit score based on the credit-related information and the one or more credit-related parameter adjustments indicated by the adjusting of the one or more of the adjustable sliders; and transmitting, to the client computer, updated user interface data reflecting the second credit score, the updated user interface data being transmitted in real time in response to receiving the score simulation request data.

2. The method of claim 1, wherein the graphical representation of the first credit score comprises an indication of a risk level associated with the first credit score.

3. The method of claim 1, wherein the graphical representation of the first credit score comprises an indicator of a real credit score and an indicator of a simulated score, and wherein the updated user interface data reflecting the second credit score is configured to cause the indicator of the simulated score to be repositioned according to the second credit score, while the indicator of the real credit score remains positioned according to the first credit score.

4. The method of claim 1, wherein both the first credit score and the second credit score are calculated based on the same credit scoring model.

5. The method of claim 1, wherein the credit-related information is based upon credit information received from a credit bureau.

6. The method of claim 1, wherein the credit-related information is based upon information received from the consumer.

7. The method of claim 1, wherein the one or more adjustable sliders are configured to enable a user of the client computer to adjust one or more credit-related parameters by dragging a portion respective of the one or more adjustable slider with a cursor.

8. A credit score simulation computer system, comprising:
a computer-readable storage medium configured to maintain a credit information data structure indicative of credit-related information associated with a consumer;
a network communications interface configured to communicate with a client computer via a network; and
a computer processor configured to transmit, via the network communications interface, user interface data configured to cause the client computer to display a user interface including a graphical representation of a first credit score calculated based on the credit-related information, the user interface further including one or more adjustable sliders configured to enable a user of the client computer to adjust one or more credit-related parameters;
the computer processor further configured to transmit updated user interface data reflecting a second credit score calculated based on adjusted credit-related parameters received from the client computer.

9. The credit score simulation computer system of claim 8, wherein the computer processor is configured to transmit the updated user interface data in real time subsequent to receiving the adjusted credit-related parameters from the client computer.

10. The method of claim 1, wherein the graphical representation of the first credit score comprises an indication of a risk level associated with the first credit score.

11. The method of claim 1, wherein the graphical representation of the first credit score comprises an indicator of a real credit score and an indicator of a simulated score, and wherein the updated user interface data reflecting the second credit score is configured to cause the indicator of the simulated score to be repositioned according to the second credit score, while the indicator of the real credit score remains positioned according to the first credit score.

12. The credit score simulation computer system of claim 8, wherein the first credit score and the second credit score are calculated based on the same credit scorecard.

13. The credit score simulation computer system of claim 8, wherein the user interface data further includes executable code configured to transmit a score simulation request in response to the user adjusting one or more of the adjustable sliders.

14. The credit score simulation computer system of claim 8, wherein the credit information data structure is based upon credit information received from a credit bureau.

15. The credit score simulation computer system of claim 8, wherein the credit-related information is based upon credit information received from the consumer.

16. The credit score simulation computer system of claim 8, wherein the one or more adjustable sliders are configured to enable a user of the client computer to adjust one or more credit-related parameters by dragging a portion of a slider with a mouse cursor.

17. A computing system comprising:
one or more computer processors configured to execute instructions;
a computer-readable medium storing executable instructions that, in response to execution by the one or more computer processors, cause the computing system to:
display a user interface including a graphical representation of a first credit score calculated based on credit-related information provided by a user of the user interface, the user interface further including one or more adjustable sliders configured to enable the user to adjust one or more credit-related parameters; and
update the user interface to display a second credit score calculated based on receiving adjustments made by the user to at least one of the one or more adjustable sliders.

18. The computing system of claim 17, wherein the executable instructions are further configured to cause the computing system to update the user interface to display the second credit score in real time subsequent to receiving the adjustments made by the user to the at least one of the one or more adjustable sliders.

19. The computing system of claim 17, wherein the graphical representation of the first credit score comprises an indicator of a real credit score and an indicator of a simulated score, and wherein the updated user interface displaying the second credit score is configured to cause the indicator of the simulated score to be repositioned according to the second credit score, while the indicator of the real credit score remains positioned according to the first credit score.

20. The computing system of claim 17, wherein the first credit score is calculated based on a credit scorecard and the second credit score is calculated based on the same credit scorecard.

* * * * *